US012578851B2

(12) United States Patent　　　(10) Patent No.: US 12,578,851 B2
Dudley　　　(45) Date of Patent: Mar. 17, 2026

(54) SYSTEMS, METHODS, AND GRAPHICAL USER INTERFACES FOR GENERATING SHORT RUN CONTROL CHARTS

(71) Applicant: JMP Statistical Discovery LLC, Cary, NC (US)

(72) Inventor: Anne Laurene Dudley, Chapel Hill, NC (US)

(73) Assignee: JMP Statistical Discovery LLC, Cary, NC (US)

( * ) Notice: Subject to any disclaimer, the term of this patent is extended or adjusted under 35 U.S.C. 154(b) by 0 days.

(21) Appl. No.: 18/759,065

(22) Filed: Jun. 28, 2024

(65) Prior Publication Data

US 2025/0156062 A1　　May 15, 2025

Related U.S. Application Data

(60) Provisional application No. 63/601,196, filed on Nov. 20, 2023, provisional application No. 63/548,218, filed on Nov. 12, 2023.

(51) Int. Cl.
　　*G06F 3/0486*　　(2013.01)
(52) U.S. Cl.
　　CPC .................................. *G06F 3/0486* (2013.01)
(58) Field of Classification Search
　　None
　　See application file for complete search history.

(56) References Cited

U.S. PATENT DOCUMENTS

| | | | | |
|---|---|---|---|---|
| 6,961,732 B2 * | 11/2005 | Hellemann | ............ | G06Q 10/06 707/999.102 |
| 9,208,209 B1 * | 12/2015 | Katz | ....................... | G06N 5/025 |
| 9,467,745 B1 * | 10/2016 | Hotchkiss | .............. | H04N 21/25 |
| 9,495,473 B2 * | 11/2016 | Gardner | .................. | H04L 41/22 |
| 10,559,043 B1 * | 2/2020 | Schlintl | ............ | G06Q 10/06316 |
| 11,561,690 B2 * | 1/2023 | Lekivetz | ............. | G06F 3/04847 |
| 2004/0164983 A1 * | 8/2004 | Khozai | ..................... | G09B 5/00 345/440 |
| 2004/0205523 A1 * | 10/2004 | Miller | ..................... | G06F 40/18 715/227 |
| 2005/0232055 A1 * | 10/2005 | Couckuyt | ............. | G06F 3/0486 365/227 |
| 2010/0057237 A1 * | 3/2010 | Kettaneh | .......... | G05B 19/41885 700/103 |
| 2010/0058250 A1 * | 3/2010 | Stannard | ............... | G06T 11/206 715/856 |

(Continued)

OTHER PUBLICATIONS

Z-mR Control Charts for Short Production Runds by SPC for excel, https://web.archive.org/web/20150823051616/https://www.spcforexcel. com/knowledge/variable-control-charts/z-mr-control-charts/, published 2015 (Year: 2015).*

(Continued)

*Primary Examiner* — Henry Orr
(74) *Attorney, Agent, or Firm* — Padowithz Alce; Quintin Scheitlin; Alce PLLC

(57)　　　　ABSTRACT
A system, method, and computer-program product includes displaying a user interface that is configured to create a short run control chart from a dataset; detecting, via the user interface, a plurality of drag-and-drop inputs; converting, based on the plurality of drag-and-drop inputs, values from a first column of the dataset into location data points; and updating a real-time view of the short run control chart to include the location data points.

37 Claims, 14 Drawing Sheets

(56) References Cited

U.S. PATENT DOCUMENTS

| | | | |
|---|---|---|---|
| 2010/0235771 A1* | 9/2010 | Gregg, III | G06T 11/206 |
| | | | 715/769 |
| 2012/0271748 A1* | 10/2012 | DiSalvo | G06Q 40/04 |
| | | | 705/37 |
| 2014/0074797 A1* | 3/2014 | McFarland | G06Q 10/06375 |
| | | | 707/688 |
| 2017/0024016 A1* | 1/2017 | Ho | G06F 3/04847 |
| 2017/0139894 A1* | 5/2017 | Welch | G06Q 30/00 |
| 2020/0011736 A1* | 1/2020 | Huang | G01J 1/44 |
| 2022/0351222 A1* | 11/2022 | Najmi | G06Q 10/06393 |

OTHER PUBLICATIONS

Dr. Jerry Burch, How to make Run Chart and Control Chart, (hereinafter "NPL Youtube"), published Aug. 19, 2020 ( https://www.youtube.com/watch?v=-xqY5vevARM&t=4s) (Year: 2020).*

Dr. Jerry Burch, How to make run chart and control chart, youtube video, Aug. 19, 2020 (Year: 2020).*

NIST, "6.3.1 What are Control Charts?," 1997, Engineering Statistics Handbook, pp. 1-3.

NHS Institute for Innovation and Immprovement, "A Guide to Creating and interpreting Run and Control Charts," 2009, pp. 1-32.

Minitab, "Overview for Z-MR Chart," 2023, pp. 1-2.

ASQ, "Quality Glossary-C" 1997, Engineering Statistics Handbook, Jun. 2007, pp. 1-3.

ASQ, "Process Control for Short and Small runs," Quality Progress, Apr. 1993, pp. 1-2.

* cited by examiner

Figure 7:
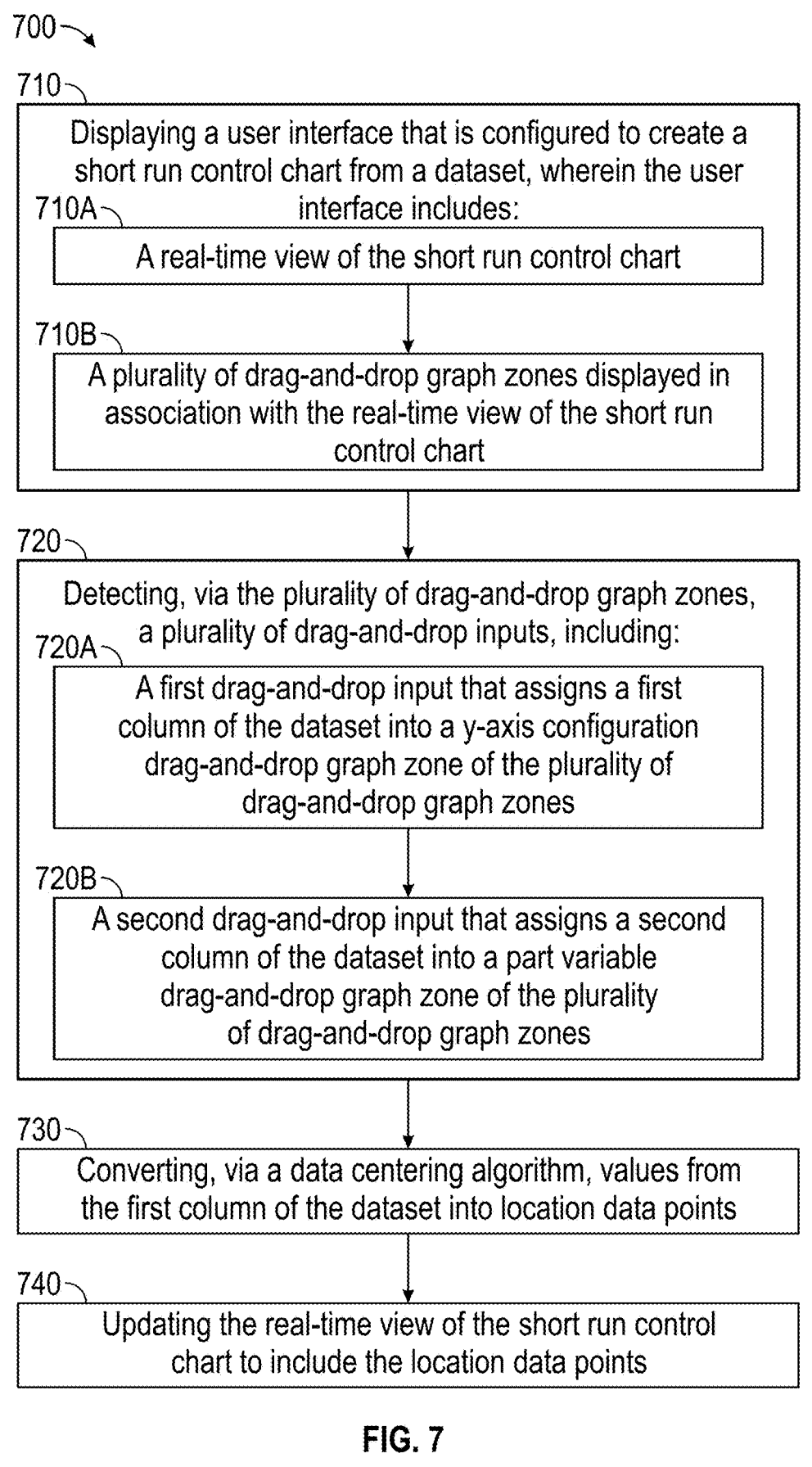

700

710

Displaying a user interface that is configured to create a short run control chart from a dataset, wherein the user interface includes:

710A

A real-time view of the short run control chart

710B

A plurality of drag-and-drop graph zones displayed in association with the real-time view of the short run control chart

720

Detecting, via the plurality of drag-and-drop graph zones, a plurality of drag-and-drop inputs, including:

720A

A first drag-and-drop input that assigns a first column of the dataset into a y-axis configuration drag-and-drop graph zone of the plurality of drag-and-drop graph zones

720B

A second drag-and-drop input that assigns a second column of the dataset into a part variable drag-and-drop graph zone of the plurality of drag-and-drop graph zones

730

Converting, via a data centering algorithm, values from the first column of the dataset into location data points

740

Updating the real-time view of the short run control chart to include the location data points

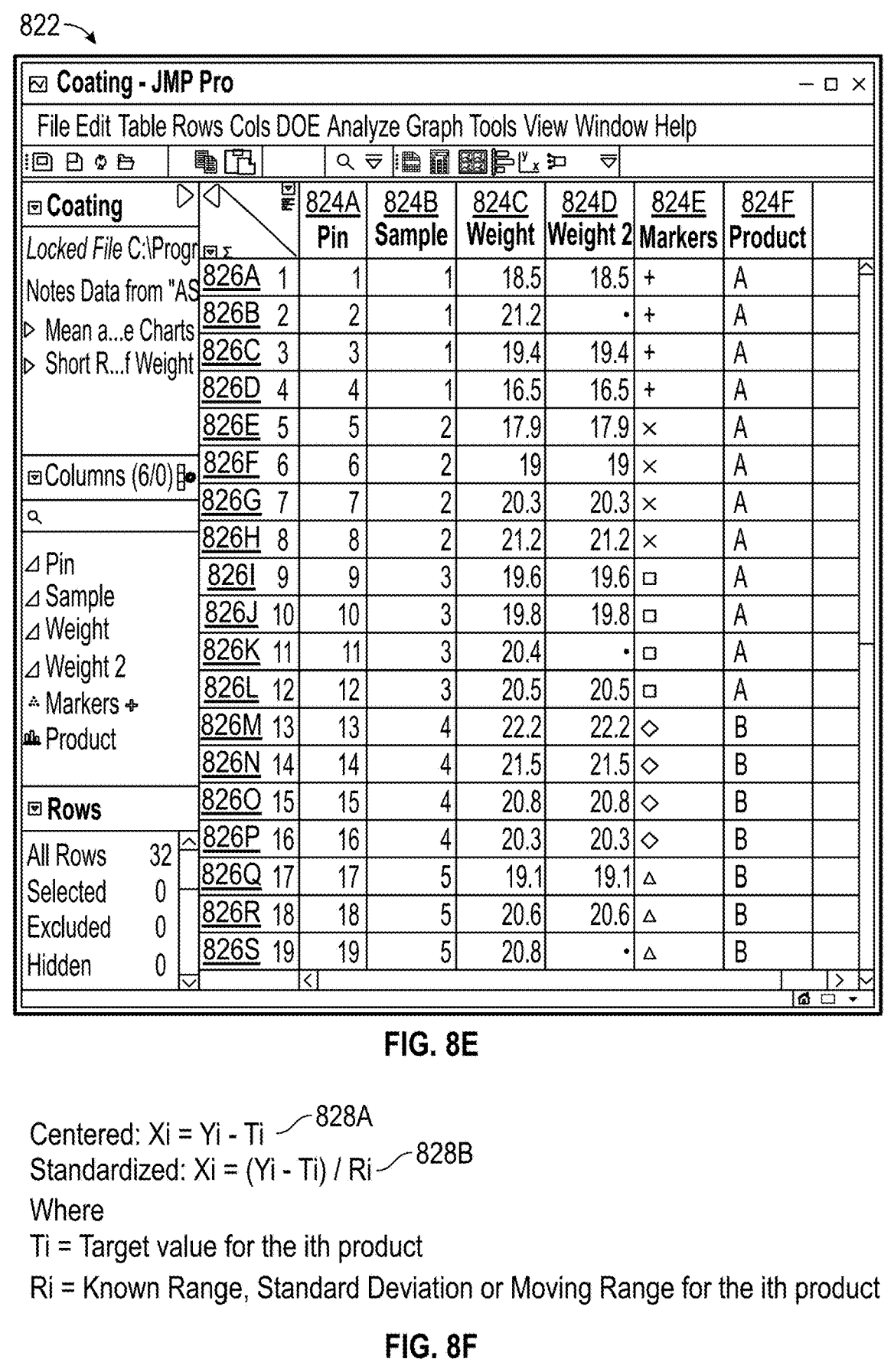

| Coating - JMP Pro | | | | | | | − □ × |
|---|---|---|---|---|---|---|---|

File Edit Table Rows Cols DOE Analyze Graph Tools View Window Help

| Coating | | | 824A Pin | 824B Sample | 824C Weight | 824D Weight 2 | 824E Markers | 824F Product | |
|---|---|---|---|---|---|---|---|---|---|
| Locked File C:\Progr | | 826A | 1 | 1 | 1 | 18.5 | 18.5 | + | A |
| Notes Data from "AS | | 826B | 2 | 2 | 1 | 21.2 | · | + | A |
| ▷ Mean a...e Charts | | 826C | 3 | 3 | 1 | 19.4 | 19.4 | + | A |
| ▷ Short R...f Weight | | 826D | 4 | 4 | 1 | 16.5 | 16.5 | + | A |
| | | 826E | 5 | 5 | 2 | 17.9 | 17.9 | × | A |
| | | 826F | 6 | 6 | 2 | 19 | 19 | × | A |
| Columns (6/0) | | 826G | 7 | 7 | 2 | 20.3 | 20.3 | × | A |
| | | 826H | 8 | 8 | 2 | 21.2 | 21.2 | × | A |
| | | 826I | 9 | 9 | 3 | 19.6 | 19.6 | □ | A |
| ⊿ Pin | | 826J | 10 | 10 | 3 | 19.8 | 19.8 | □ | A |
| ⊿ Sample | | 826K | 11 | 11 | 3 | 20.4 | · | □ | A |
| ⊿ Weight | | 826L | 12 | 12 | 3 | 20.5 | 20.5 | □ | A |
| ⊿ Weight 2 | | 826M | 13 | 13 | 4 | 22.2 | 22.2 | ◇ | B |
| ⚘ Markers ✦ | | 826N | 14 | 14 | 4 | 21.5 | 21.5 | ◇ | B |
| Product | | 826O | 15 | 15 | 4 | 20.8 | 20.8 | ◇ | B |
| Rows | | 826P | 16 | 16 | 4 | 20.3 | 20.3 | ◇ | B |
| All Rows 32 | | 826Q | 17 | 17 | 5 | 19.1 | 19.1 | △ | B |
| Selected 0 | | 826R | 18 | 18 | 5 | 20.6 | 20.6 | △ | B |
| Excluded 0 | | 826S | 19 | 19 | 5 | 20.8 | · | △ | B |
| Hidden 0 | | | | | | | | | |

FIG. 8E

Centered: Xi = Yi - Ti — 828A

Standardized: Xi = (Yi - Ti) / Ri — 828B

Where

Ti = Target value for the ith product

Ri = Known Range, Standard Deviation or Moving Range for the ith product

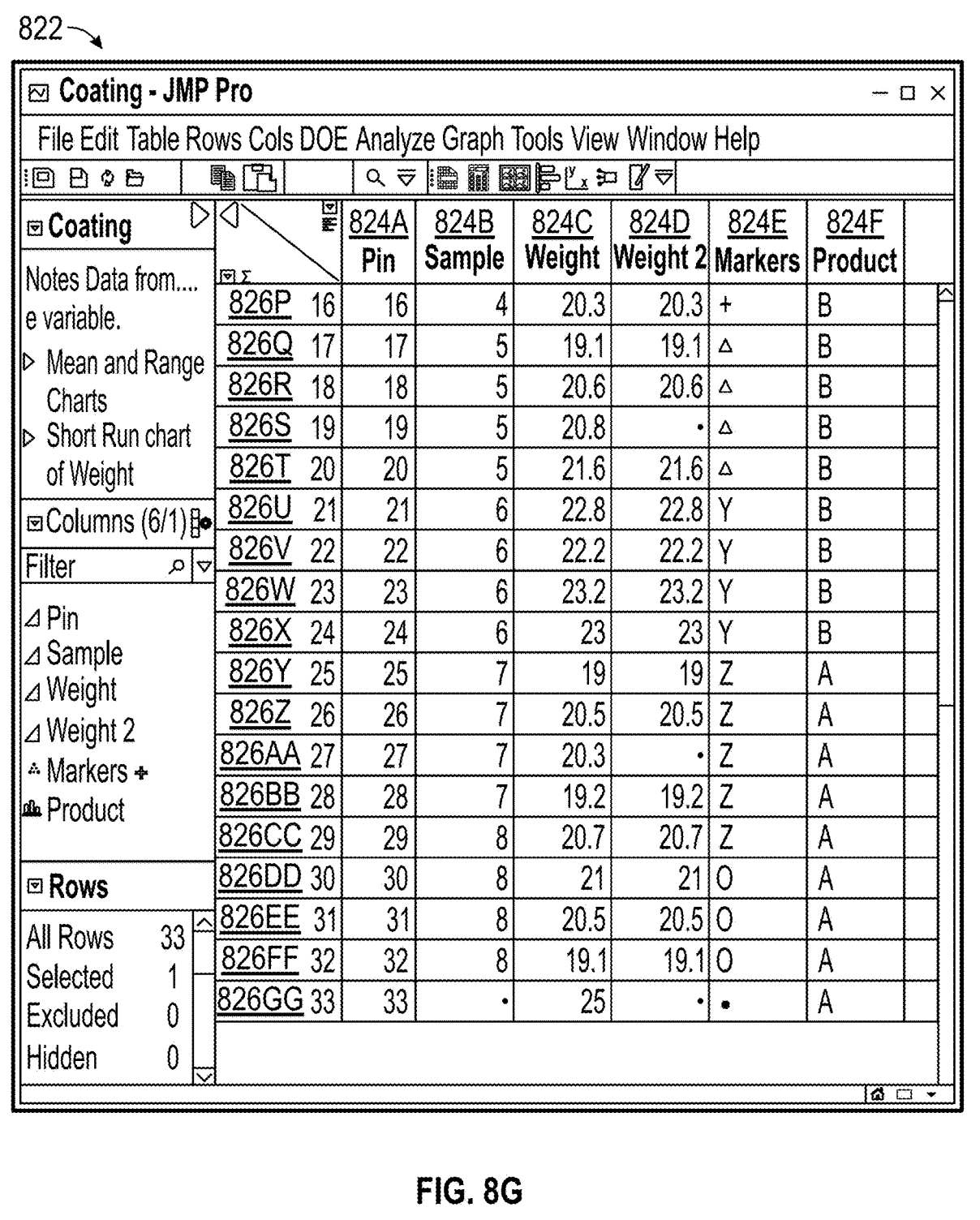

| ⊠ Coating - JMP Pro | | | | | | | — □ × |

File Edit Table Rows Cols DOE Analyze Graph Tools View Window Help

| ⊟ Coating ▷ | | | 824A <u>Pin</u> | 824B <u>Sample</u> | 824C <u>Weight</u> | 824D <u>Weight 2</u> | 824E <u>Markers</u> | 824F <u>Product</u> |
|---|---|---|---|---|---|---|---|---|
| Notes Data from.... | | | | | | | | |
| e variable. | 826P | 16 | 16 | 4 | 20.3 | 20.3 | + | B |
| ▷ Mean and Range | 826Q | 17 | 17 | 5 | 19.1 | 19.1 | △ | B |
| Charts | 826R | 18 | 18 | 5 | 20.6 | 20.6 | △ | B |
| ▷ Short Run chart | 826S | 19 | 19 | 5 | 20.8 | · △ | | B |
| of Weight | 826T | 20 | 20 | 5 | 21.6 | 21.6 | △ | B |
| ⊟Columns (6/1) | 826U | 21 | 21 | 6 | 22.8 | 22.8 | Y | B |
| | 826V | 22 | 22 | 6 | 22.2 | 22.2 | Y | B |
| Filter | 826W | 23 | 23 | 6 | 23.2 | 23.2 | Y | B |
| ⊿ Pin | 826X | 24 | 24 | 6 | 23 | 23 | Y | B |
| ⊿ Sample | 826Y | 25 | 25 | 7 | 19 | 19 | Z | A |
| ⊿ Weight | 826Z | 26 | 26 | 7 | 20.5 | 20.5 | Z | A |
| ⊿ Weight 2 | 826AA | 27 | 27 | 7 | 20.3 | · | Z | A |
| ⚘ Markers + | 826BB | 28 | 28 | 7 | 19.2 | 19.2 | Z | A |
| ⛶ Product | 826CC | 29 | 29 | 8 | 20.7 | 20.7 | Z | A |
| ⊟ Rows | 826DD | 30 | 30 | 8 | 21 | 21 | O | A |
| | 826EE | 31 | 31 | 8 | 20.5 | 20.5 | O | A |
| All Rows   33 | 826FF | 32 | 32 | 8 | 19.1 | 19.1 | O | A |
| Selected   1 | 826GG | 33 | 33 | · | 25 | · | ▪ | A |
| Excluded   0 | | | | | | | | |
| Hidden   0 | | | | | | | | |

FIG. 8G

SYSTEMS, METHODS, AND GRAPHICAL USER INTERFACES FOR GENERATING SHORT RUN CONTROL CHARTS

CROSS-REFERENCE TO RELATED APPLICATIONS

This application claims the benefit of U.S. Provisional Application No. 63/601,196, filed on 20 Nov. 2023, and U.S. Provisional Application No. 63/548,218, filed on 12 Nov. 2023, which are incorporated in their entireties by this reference.

TECHNICAL FIELD

This invention relates generally to the data visualization field and, more specifically, to new and useful systems and methods for generating short run control charts.

BACKGROUND

In the field of statistical process control (SPC), a short run control chart is used to monitor and analyze processes that operate in small batches or runs. Conventional techniques for creating short run control charts often lack flexibility and responsiveness. For example, these conventional techniques typically remain inactive and do not generate output until all necessary chart configuration variables have been specified and confirmed by the user. This inability to preview (e.g., foresee) changes as the chart configuration variables are assigned or changed severely impedes iterative creation of a short run control chart.

Accordingly, there is a need for new and useful systems and methods that enhance the interactivity and responsiveness of short run control chart generation processes. The embodiments of the present application provide technical solutions that at least address the needs described above, as well as the deficiencies of the state of the art.

BRIEF SUMMARY OF THE INVENTION(S)

In some embodiments, a computer-program product comprising a non-transitory machine-readable storage medium storing computer instructions that, when executed by one or more processors, perform operations comprising: displaying a user interface that is configured to create a short run control chart from a dataset, wherein the user interface includes: a real-time view of the short run control chart, and a plurality of drag-and-drop graph zones displayed in association with the real-time view of the short run control chart; detecting, via the plurality of drag-and-drop graph zones, a plurality of drag-and-drop inputs, including: a first drag-and-drop input that assigns a first column of the dataset into a y-axis configuration drag-and-drop graph zone of the plurality of drag-and-drop graph zones, and a second drag-and-drop input that assigns a second column of the dataset into a part variable drag-and-drop graph zone of the plurality of drag-and-drop graph zones; converting, via a data centering algorithm, values from the first column of the dataset into location data points; and updating the real-time view of the short run control chart to include the location data points.

In some embodiments, the second drag-and-drop input includes hovering a draggable item corresponding to the second column of the dataset over the part variable drag-and-drop graph zone, and updating the real-time view of the short run control chart includes: while the second drag-and-drop input is hovering the draggable item over the part variable drag-and-drop graph zone: updating the real-time view of the short run control chart to include a preview of the short run control chart that indicates a next state of the short run control chart following a completion of the second drag-and-drop input.

In some embodiments, the preview of the short run control chart includes the location data points, and updating the real-time view of the short run control chart further includes: after detecting the completion of the second drag-and-drop input: maintaining display of the location data points in the real-time view of the short run control chart.

In some embodiments, the location data points are centered data points, the values from the first column of the dataset include one or more values associated with a first category and one or more values associated with a second category, and converting the values from the first column of the dataset into the centered data points includes: converting a respective value associated with the first category to a centered data point by subtracting a target category statistic computed for the first category from the respective value associated with the first category, and converting a respective value associated with the second category to a centered data point by subtracting the respective value associated with the second category from a target category statistic computed for the second category.

In some embodiments, the target category statistic for the first category is an average of the values in the first column of the dataset that correspond to the first category, and the target category statistic for the second category is an average of the values in the first column of the dataset that correspond to the second category.

In some embodiments, the real-time view of the short run control chart includes a plurality of charts, including a location chart and a dispersion chart that share a common x-axis. In some embodiments, the computer instructions, when executed by the one or more processors, perform operations further comprising: converting, via a data dispersion algorithm, the values from the first column of the dataset into dispersion data points, and updating the real-time view of the short run control chart includes: updating the real-time view of the short run control chart to include the location data points in the location chart, and updating the real-time view of the short run control chart to include the dispersion data points in the dispersion chart.

In some embodiments, the location data points include one or more location data points corresponding to a first category and one or more location data points corresponding to a second category, and the real-time view of the short run control chart that includes the location data points further comprises: one or more category separator lines that visually separate the one or more location data points corresponding to the first category from the one or more location data points corresponding to the second category.

In some embodiments, the computer instructions, when executed by the one or more processors, perform operations further comprising: converting, via a data dispersion algorithm, the values from the first column of the dataset into dispersion data points, wherein the dispersion data points include: one or more dispersion data points corresponding to the first category, and one or more dispersion data points corresponding to the second category, the real-time view of the short run control chart includes the location data points and further includes the dispersion data points, and the one or more category separator lines visually separate: the one or more location data points corresponding to the first category from the one or more location data points corresponding to the second category, and the one or more dispersion data points corresponding to the first category from the one or more dispersion data points corresponding to the second category.

In some embodiments, the user interface further includes a column selection region, and the column selection region includes one or more draggable items corresponding to one or more columns of the dataset, including a first draggable item corresponding to the first column of the dataset and a second draggable item corresponding to the second column of the dataset.

In some embodiments, the first drag-and-drop input comprises a selection of the first draggable item and a movement of the first draggable item from the column selection region to the y-axis configuration drag-and-drop graph zone, and the second drag-and-drop input comprises a selection of the second draggable item and a movement of the second draggable item from the column selection region to the part variable drag-and-drop graph zone.

In some embodiments, the dataset represents measurements collected from a manufacturing line, the dataset includes rows of data that correspond to production runs conducted on the manufacturing line, and a respective row of data includes one or more parameters observed for a respective production run and specifies a product manufactured during the respective production run.

In some embodiments, the location data points are standardized centered data points, the values from the first column of the dataset include one or more values associated with a first category and one or more values associated with a second category, and converting the values from the first column of the dataset into the standardized centered data points includes: converting a respective value associated with the first category to a standardized centered data point by subtracting a target category statistic computed for the first category from the respective value associated with the first category and dividing a result of the subtracting by a dispersion category statistic computed for the first category, and converting a respective value associated with the second category to a standardized centered data point by subtracting the respective value associated with the second category from a target category statistic computed for the second category and dividing a result of the subtracting by a dispersion category statistic computed for the second category.

In some embodiments, the dispersion category statistic computed for the first category is a range of the values in the first column of the dataset that correspond to the first category, and the dispersion category statistic computed for the second category is a range of the values in the first column of the dataset that correspond to the second category.

In some embodiments, the dispersion category statistic computed for the first category is a standard deviation of the values in the first column of the dataset that correspond to the first category, and the dispersion category statistic computed for the second category is a standard deviation of the values in the first column of the dataset that correspond to the second category.

In some embodiments, the dispersion category statistic computed for the first category is a moving range of the values in the first column of the dataset that correspond to the first category, and the dispersion category statistic computed for the second category is a moving range of the values in the first column of the dataset that correspond to the second category.

In some embodiments, the location data points include one or more location data points corresponding to a first category and one or more location data points corresponding to a second category, and updating the real-time view of the short run control chart to include the location data points includes: displaying the one or more location data points corresponding to the first category with a first marker color, and displaying the one or more location data points corresponding to the second category with a second marker color, different from the first marker color.

In some embodiments, the computer instructions, when executed by the one or more processors, perform operations further comprising: converting, via a data dispersion algorithm, the values from the first column of the dataset into dispersion data points, wherein the dispersion data points include: one or more dispersion data points corresponding to the first category, and one or more dispersion data points corresponding to the second category, the real-time view of the short run control chart includes the location data points and further includes the dispersion data points, and updating the real-time view of the short run control chart to include the dispersion data points comprises: displaying the one or more dispersion data points corresponding to the first category with the first marker color, and displaying the one or more dispersion data points corresponding to the second category with the second marker color.

In some embodiments, the dataset is a multi-category dataset, and the multi-category dataset includes rows of data associated with a plurality of categories, including: one or more rows of data associated with a first category of the plurality of categories, and one or more rows of data associated with a second category of the plurality of categories.

In some embodiments, the plurality of categories correspond to different products, the first category corresponds to a first product, and the second category corresponds to a second product, different from the first product.

In some embodiments, the real-time view of the short run control chart is dynamically updated as the plurality of drag-and-drop inputs are detected, and dynamically updating the real-time view of the short run control chart as the plurality of drag-and-drop inputs are detected includes: in response to detecting the plurality of drag-and-drop inputs: converting, via the data centering algorithm, the values from the first column of the dataset into the location data points; and updating the real-time view of the short run control chart to include the location data points.

In some embodiments, the computer instructions, when executed by the one or more processors, perform operations further comprising: detecting that a new row has been added to the dataset, and based on detecting the new row in the dataset: converting, via the data centering algorithm, a value corresponding to the first column in the new row to an additional location data point, and updating the real-time view of the short run control chart to include the additional location data point.

In some embodiments, the real-time view of the short run control chart includes a y-axis, the y-axis of the real-time view of the short run control chart uses a first range of values to display the location data points, the additional location data point exceeds the first range of values, and updating the real-time view of the short run control chart to include the additional location data point comprises: scaling the y-axis from having the first range of values to having a second range of values that is not exceeded by the additional location data point.

In some embodiments, the real-time view of the short run control chart includes an x-axis, the x-axis of the real time view of the short run control chart uses a first range of values to display the location data points, the additional location data point exceeds the first range of values, and updating the real-time view of the short run control chart to include the additional location data point comprises: scaling the x-axis from having the first range of values to having a second range of values that is not exceeded by the additional location data point.

In some embodiments, a computer-implemented method comprises: displaying a user interface that is configured to create a short run control chart from a dataset, wherein the user interface includes: a real-time view of the short run control chart, and a plurality of drag-and-drop graph zones displayed in association with the real-time view of the short run control chart; detecting, via the plurality of drag-and-drop graph zones, a plurality of drag-and-drop inputs, including: a first drag-and-drop input that assigns a first column of the dataset into a y-axis configuration drag-and-drop graph zone of the plurality of drag-and-drop graph zones, and a second drag-and-drop input that assigns a second column of the dataset into a part variable drag-and-drop graph zone of the plurality of drag-and-drop graph zones; converting, via a data centering algorithm, values from the first column of the dataset into location data points; and updating the real-time view of the short run control chart to include the location data points.

In some embodiments, the second drag-and-drop input includes hovering a draggable item corresponding to the second column of the dataset over the part variable drag-and-drop graph zone, and updating the real-time view of the short run control chart includes: while the second drag-and-drop input is hovering the draggable item over the part variable drag-and-drop graph zone: updating the real-time view of the short run control chart to include a preview of the short run control chart that indicates a next state of the short run control chart following a completion of the second drag-and-drop input.

In some embodiments, the real-time view of the short run control chart includes a plurality of charts, including a location chart and a dispersion chart that share a common x-axis, the computer-implemented method further comprises: converting, via a data dispersion algorithm, the values from the first column of the dataset into dispersion data points, and updating the real-time view of the short run control chart includes: updating the real-time view of the short run control chart to include the location data points in the location chart, and updating the real-time view of the short run control chart to include the dispersion data points in the dispersion chart.

In some embodiments, the user interface further includes a column selection region, and the column selection region includes one or more draggable items corresponding to one or more columns of the dataset, including a first draggable item corresponding to the first column of the dataset and a second draggable item corresponding to the second column of the dataset.

In some embodiments, a computer-implemented system comprises: one or more processors; a memory; a computer-readable medium operably coupled to the one or more processors, the computer-readable medium having computer-readable instructions stored thereon that, when executed by the one or more processors, cause a computing device to perform operations comprising: displaying a user interface that is configured to create a short run control chart from a dataset, wherein the user interface includes: a real-time view of the short run control chart, and a plurality of drag-and-drop graph zones displayed in association with the real-time view of the short run control chart; detecting, via the plurality of drag-and-drop graph zones, a plurality of drag-and-drop inputs, including: a first drag-and-drop input that assigns a first column of the dataset into a y-axis configuration drag-and-drop graph zone of the plurality of drag-and-drop graph zones, and a second drag-and-drop input that assigns a second column of the dataset into a part variable drag-and-drop graph zone of the plurality of drag-and-drop graph zones; converting, via a data centering algorithm, values from the first column of the dataset into location data points; and updating the real-time view of the short run control chart to include the location data points.

In some embodiments, the second drag-and-drop input includes hovering a draggable item corresponding to the second column of the dataset over the part variable drag-and-drop graph zone, and updating the real-time view of the short run control chart includes: while the second drag-and-drop input is hovering the draggable item over the part variable drag-and-drop graph zone: updating the real-time view of the short run control chart to include a preview of the short run control chart that indicates a next state of the short run control chart following a completion of the second drag-and-drop input.

In some embodiments, the preview of the short run control chart includes the location data points, and updating the real-time view of the short run control chart further includes: after detecting the completion of the second drag-and-drop input: maintaining display of the location data points in the real-time view of the short run control chart.

BRIEF DESCRIPTION OF THE FIGURES

FIG. 7 illustrates an example method for generating a short run control chart with drag-and-drop user inputs, according to at least one embodiment of the present technology.

FIG. 8E illustrates an example of a multi-category dataset, according to at least one embodiment of the present technology.

FIG. 8F illustrates example equations for converting raw data points of a dataset into location and dispersion data points, according to at least one embodiment of the present technology.

FIGS. 8G and 8H illustrate an example of updating a short run control chart based on new rows in a dataset, according to at least one embodiment of the present technology.

DESCRIPTION OF THE PREFERRED EMBODIMENTS

The following description of the preferred embodiments of the inventions are not intended to limit the inventions to these preferred embodiments, but rather to enable any person skilled in the art to make and use these inventions.

Detailed Description

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination can correspond to a return of the function to the calling function or the main function.
Example Systems Systems depicted in some of the figures may be provided in various configurations. In some embodiments, the systems may be configured as a distributed system where one or more components of the system are distributed across one or more networks in a cloud computing system.

Figure 1:
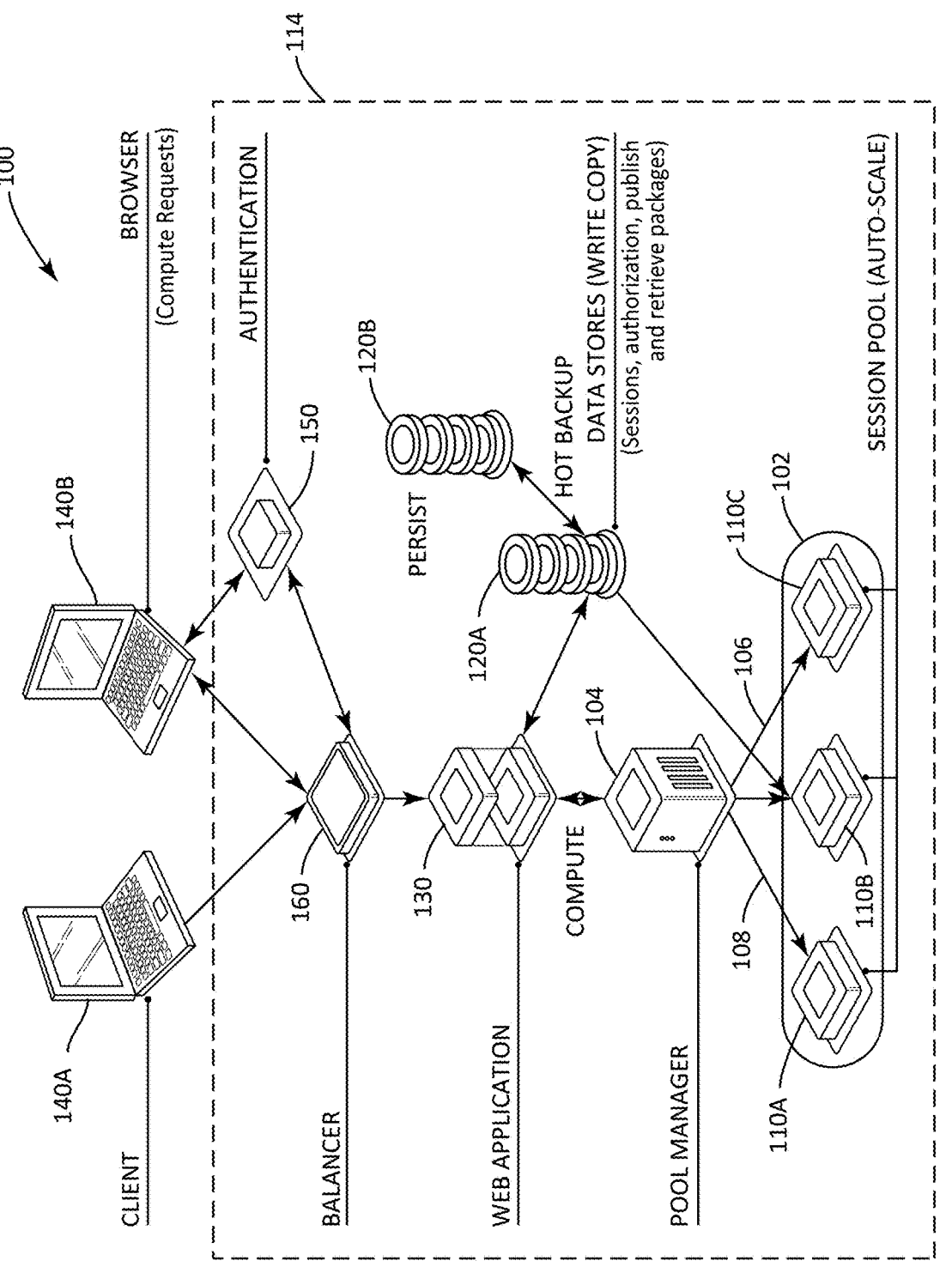
FIG. 1 illustrates an example network, including an example set of devices communicating with each other, according to at least one embodiment of the present technology.

FIG. 1 illustrates an example network 100 including an example set of devices communicating with each other (e.g., over one or more of an exchange system or a network), according to embodiments of the present technology. Network 100 includes network devices configured to communicate with a variety of types of client devices, for example, client devices 140, over a variety of types of communication channels. A client device 140 may be configured to communicate over a public or private network (e.g., client device 140B is configured to support a browser for computing requests or providing authentication).

Network devices and client devices can transmit a communication over a network 100. Network 100 may include one or more of different types of networks, including a wireless network, a wired network, or a combination of a wired and wireless network. Examples of suitable networks include the Internet, a personal area network, a local area network (LAN), a wide area network (WAN), a wireless local area network (WLAN), cloud network, or a cellular network. A wireless network may include a wireless interface or combination of wireless interfaces. As an example, a network in the one or more networks may include a short-range communication channel, such as a Bluetooth or a Bluetooth Low Energy channel. A wired network may include a wired interface. The wired and/or wireless networks may be implemented using routers, access points, base stations, bridges, gateways, or the like, to connect devices in the network. The one or more networks can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS), or other available protocols such as according to an Open Systems Interaction model. In addition, data and/or transactional details may be encrypted. Networks may include other devices for infrastructure for the network. For example, a cloud network may include cloud infrastructure system on demand. As another example, one or more client devices may utilize an Internet of Things (IoT) infrastructure where things (e.g., machines, devices, phones, sensors) can be connected to networks and the data from these things can be collected and processed within the things and/or external to the things. IoT may be implemented with various infrastructure such as for accessibility (technologies that get data and move it), embed-ability (devices with embedded sensors), and IoT services. Industries in the IoT space may include automotive (connected car), manufacturing (connected factory), smart cities, energy and retail.

Network devices and client devices can be different types of devices or components of devices. For example, client device 140 is shown as a laptop and balancer 160 is shown as a processor. Client devices and network devices could be other types of devices or components of other types of devices such as a mobile phone, laptop computer, tablet computer, temperature sensor, motion sensor, and audio sensor. Additionally, or alternatively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, and flow rate sensors. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current. The sensors may be mounted to various components used as part of a variety of different types of systems (e.g., an oil drilling operation).

The network devices may detect and record data related to the environment that it monitors, and transmit that data to network 100.

As noted, one type of system that may include various sensors that collect data to be processed and/or transmitted to a computing environment (not shown) according to certain embodiments includes an oil drilling system. For example, the one or more drilling operation sensors may include, for example, surface sensors that measure a stand-pipe pressure, a surface torque, and a rotation speed of a drill pipe, and downhole sensors that measure a rotation speed of a bit and fluid densities. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, for example, the rate of penetration and pump pressure may also be stored and used for modeling, prediction, or classification.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device or client device may include a home automation switch that may be coupled with a home appliance. In another embodiment, a network or client device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment (e.g., computing environment or another computing environment not shown) according to certain embodiments includes a manufacturing environment (e.g., manufacturing products or energy). A variety of different network devices may be included in an energy pool, such as various devices within one or more power plants, energy farms (e.g., wind farm, and solar farm) energy storage facilities, factories, homes and businesses of consumers. One or more of such devices may include one or more sensors that detect energy gain or loss, electrical input or output or loss, and a variety of other efficiencies. These sensors may collect data to inform users of how the energy pool, and individual devices within the pool, may be functioning and how they may be made more efficient. In a manufacturing environment, image data can be taken of the manufacturing process or other readings of manufacturing equipment. For example, in a semiconductor manufacturing environment, images can be used to track, for example, process points (e.g., movement from a bonding site to a packaging site), and process parameters (e.g., bonding force, electrical properties across a bond of an integrated circuit).

Network device sensors may also perform processing on data it collects before transmitting the data to a computing environment, or before deciding whether to transmit data to a computing environment. For example, network devices may determine whether data collected meets certain rules, for example by comparing data or values calculated from the data and comparing that data to one or more thresholds. The network device may use this data and/or comparisons to determine if the data should be transmitted to a computing environment for further use or processing.

Devices in computing environment 114 may include specialized computers, servers, or other machines that are configured to individually and/or collectively process large amounts of data (e.g., using a session pool 102). The computing environment 114 may also include storage devices (e.g., data stores 120) that include one or more databases of structured data, such as data organized in one or more hierarchies, or unstructured data. The databases may communicate with the processing devices within computing environment 114 to distribute data to them and store data used in the computing environment 114. Computing environment 114 may collect, analyze and/or store data from or pertaining to communications, client device operations, client rules, and/or user-associated actions stored at one or more devices in computing environment 114. Such data may influence communication routing to the devices within computing environment 114, and how data is stored or processed within computing environment 114, among other actions.

Network 100 may also include one or more network-attached data stores 120. Network-attached data stores 120 are used to store data to be processed by the computing environment 114 as well as any intermediate or final data generated by the computing system in non-volatile memory. For instance, data stores 120 can perform functions such as writing and copying data and can provide data storage for network functions such as sessions, authorization, publishing and retrieving packages. In certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores 120 may store a variety of different types of data organized in a variety of different ways and from a variety of different sources. For example, network-attached data stores 120 may include storage other than primary storage located within computing environment 114 that is directly accessible by processors located therein. Network-attached data stores 120 may include secondary, tertiary, auxiliary, or back-up storage (e.g., data storage 120B), such as large hard drives, servers, and virtual memory, among other types. Storage devices may include portable or non-portable storage devices, optical storage devices, and various other mediums capable of storing and containing data (e.g., computer a machine-readable storage medium or computer-readable storage medium such as computer readable medium 210 in FIG. 2).

Furthermore, the data stores may hold a variety of different types of data. For example, network-attached data stores 120 may hold unstructured (e.g., raw) data, such as manufacturing data (e.g., a database containing records identifying products being manufactured with parameter data for each product, such as performance metrics or criteria) or product sales databases (e.g., a database containing individual data records identifying details of individual product performance).

The unstructured data may be presented to the computing environment 114 in different forms such as a flat file or a conglomerate of data records and may have data values and accompanying time stamps. The computing environment 114 may be used to analyze the unstructured data in a variety of ways to determine the best way to structure (e.g., hierarchically) that data, such that the structured data is tailored to a type of further analysis on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Other devices can further be used to influence communication routing and/or processing between devices within computing environment 114 and with devices outside of computing environment 114. For example, as shown in FIG. 1, computing environment 114 may include a device 130 supporting a web application. Thus, computing environment 114 can retrieve data of interest, such as client information (e.g., product information, client rules, etc.), technical product details, news, current or predicted weather, and so on. Balancer 160 can be used to balance and direct load within the computing environment 114. Authentication device 150 can be used to provide authentication or other security protocols for a client device, user or group accessing computing environment 114.

In addition to computing environment 114 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from sensors as the sensors continuously sense, monitor and track changes in their environments. Devices within computing environment 114 may also perform pre-analysis on data it receives to determine if the data received should be processed as part of an ongoing project. The data received and collected by computing environment 114, no matter what the source or method or timing of receipt, may be processed over a period of time for a client to determine results data based on the client's needs and rules.

FIG. 1 includes a pool of devices with a pool manager 104 and session pool 102. Network 100 includes a variety of pool managers (e.g., pool manager 104) and worker nodes 110 (e.g., devices, servers, or server farms of session pool 102), according to embodiments of the present technology. Devices of session pool 102 are communicatively connected (e.g., via communication path 108 and communication path 106). Therefore, the pool manager may transmit information (e.g., related to the session pool 102 or notifications), to and receive information from each other. Although only one pool manager 104 is shown in FIG. 1, the network 100 may include more pool managers or a different kind of device manager (e.g., a dedicated resource manager).

Session pool 102 includes one or more worker nodes (e.g., worker node 110A). Shown in FIG. 1 are three worker nodes 110A-C merely for illustration, more or less worker nodes could be present. For instance, the pool manager 104 may itself be a worker node and may not need further worker nodes to complete a task. A given worker node could include dedicated computing resources or allocated computing resources as needed to perform operations as directed by the pool manager 104. The number of worker nodes included in a session pool 102 may be dependent, for example, upon how large the project or data set is being processed by the session pool 102, the capacity of each worker node, and the time designated for the session pool 102 to complete the project. Each worker node within the session pool 102 may be connected (wired or wirelessly, and directly or indirectly) to pool manager 104. Therefore, each worker node may receive information from the pool manager 104 (e.g., an instruction to perform work on a project) and may transmit information to the pool manager 104 (e.g., a result from work performed on a project). Furthermore, worker nodes 110 may communicate with each other (either directly or indirectly). For example, worker nodes 110 may transmit data between each other related to a job being performed or an individual task within a job being performed by that worker node. However, in certain embodiments, worker nodes 110 may not, for example, be connected (communicatively or otherwise) to certain other worker nodes. In an embodiment, worker nodes may only be able to communicate with the pool manager 104 that controls it, and may not be able to communicate with other worker nodes in the session pool 102.

The pool manager 104 may connect with other devices of network 100 or an external device (e.g., a pool user, such as a server or computer). For example, a server or computer may connect to pool manager 104 and may transmit a project or job to the node. The project may include a data set. The data set may be of any size. Once the pool manager 104 receives such a project including a large data set, the pool manager 104 may distribute the data set or projects related to the data set to be performed by worker nodes 110. Alternatively, for a project including a large data set, the data set may be received or stored by a machine other than a pool manager 104 or worker node 110 (e.g., a Hadoop data node).

Pool manager may maintain knowledge of the status of the worker nodes 110 in the session pool 102 (i.e., status information), accept work requests from clients, subdivide the work across worker nodes 110, and coordinate the worker nodes 110, among other responsibilities. Worker nodes 110 may accept work requests from a pool manager

104 and provide the pool manager 104 with results of the work performed by the worker nodes 110. A session pool 102 may be started from a single node (e.g., a machine, computer, server, etc.). This first node may be assigned or may start as the primary pool manager 104 that will control any additional nodes that enter the session pool 102.

When a project is submitted for execution (e.g., by a client or a pool manager 104), it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A pool manager may be designated as the primary pool manager among multiple pool managers. A server, computer or other external device may connect to the primary pool manager. Once the pool manager receives a project, the primary pool manager may distribute portions of the project to its worker nodes for execution. For example, when a project is initiated on session pool 102, primary pool manager 104 controls the work to be performed for the project to complete the project as requested or instructed. The primary pool manager may distribute work to the worker nodes 110 based on various factors, such as which subsets or portions of projects may be completed most efficiently and in the correct amount of time. For example, a worker node may perform analysis on a portion of data that is already local (e.g., stored on) the worker node. The primary pool manager also coordinates and processes the results of the work performed by each worker node after each worker node executes and completes its job. For example, the primary pool manager may receive a result from one or more worker nodes, and the pool manager may organize (e.g., collect and assemble) the results received and compile them to produce a complete result for the project received from the end user.

Any remaining pool manager (not shown) may be assigned as backup pool manager for the project. In an embodiment, backup pool manager may not control any portion of the project. Instead, backup pool manager may serve as a backup for the primary pool manager and take over as primary pool manager if the primary pool manager were to fail.

To add another node or machine to the session pool 102, the primary pool manager may open a pair of listening sockets, for example. A socket may be used to accept work requests from clients, and the second socket may be used to accept connections from other pool nodes. The primary pool manager may be provided with a list of other nodes (e.g., other machines, computers, servers) that will participate in the pool, and the role that each node will fill in the pool. Upon startup of the primary pool manager (e.g., the first node on the pool), the primary pool manager may use a network protocol to start the server process on every other node in the session pool 102. Command line parameters, for example, may inform each node of one or more pieces of information, such as: the role that the node will have in the pool, the host name of the primary pool manager, and the port number on which the primary pool manager is accepting connections from peer nodes. The information may also be provided in a configuration file, transmitted over a secure shell tunnel, and recovered from a configuration server. While the other machines in the pool may not initially know about the configuration of the pool, that information may also be sent to each other node by the primary pool manager. Updates of the pool information may also be subsequently sent to those nodes.

For any pool manager other than the primary pool manager added to the pool, the pool manager may open multiple sockets. For example, the first socket may accept work requests from clients, the second socket may accept connections from other pool members, and the third socket may connect (e.g., permanently) to the primary pool manager. When a pool manager (e.g., primary pool manager) receives a connection from another pool manager, it first checks to see if the peer node is in the list of configured nodes in the pool. If it is not on the list, the pool manager may clear the connection. If it is on the list, it may then attempt to authenticate the connection. If authentication is successful, the authenticating node may transmit information to its peer, such as the port number on which a node is listening for connections, the host name of the node, and information about how to authenticate the node, among other information. When a node, such as the new pool manager, receives information about another active node, it will check to see if it already has a connection to that other node. If it does not have a connection to that node, it may then establish a connection to that pool manager.

Any worker node added to the pool may establish a connection to the primary pool manager and any other pool manager on the pool. After establishing the connection, it may authenticate itself to the pool (e.g., any pool manager, including both primary and backup, or a server or user controlling the pool). After successful authentication, the worker node may accept configuration information from the pool manager.

When a node joins a session pool 102 (e.g., when the node is powered on or connected to an existing node on the pool or both), the node is assigned (e.g., by an operating system of the pool) an identifier (e.g., a universally unique identifier (UUID)). This identifier may help other nodes and external entities (devices, users, etc.) to identify the node and distinguish it from other nodes. When a node is connected to the pool, the node may share its identifier with the other nodes in the pool. Since each node may share its identifier, each node may know the identifier of every other node on the pool. Identifiers may also designate a hierarchy of each of the nodes (e.g., backup pool manager) within the pool. For example, the identifiers of each of the backup pool manager may be stored in a list of backup pool manager to indicate an order in which the backup pool manager will take over for a failed primary pool manager to become a new primary pool manager. However, a hierarchy of nodes may also be determined using methods other than using the unique identifiers of the nodes. For example, the hierarchy may be predetermined, or may be assigned based on other predetermined factors.

The pool may add new machines at any time (e.g., initiated from any pool manager). Upon adding a new node to the pool, the pool manager may first add the new node to its table of pool nodes. The pool manager may also then notify every other pool manager about the new node. The nodes receiving the notification may acknowledge that they have updated their configuration information.

Primary pool manager 104 may, for example, transmit one or more communications to backup pool manager or other control or worker nodes within the session pool 102). Such communications may be sent using protocols such as periodically, at fixed time intervals, or between known fixed stages of the project's execution. The communications transmitted by primary pool manager 104 may be of varied types and may include a variety of types of information. For example, primary pool manager 104 may transmit snapshots (e.g., status information) of the session pool 102 so that backup pool manager 104 always has a recent snapshot of the session pool 102. The snapshot or pool status may include, for example, the structure of the pool (including, for example, the worker nodes in the pool, unique identifiers of the nodes, or their relationships with the primary pool manager) and the status of a project (including, for example, the status of each worker node's portion of the project). The snapshot may also include analysis or results received from worker nodes in the session pool 102. The backup pool manager may receive and store the backup data received from the primary pool manager. The backup pool manager may transmit a request for such a snapshot (or other information) from the primary pool manager, or the primary pool manager may send such information periodically to the backup pool manager.

As noted, the backup data may allow the backup pool manager to take over as primary pool manager if the primary pool manager fails without requiring the pool to start the project over from scratch. If the primary pool manager fails, the backup pool manager that will take over as primary pool manager may retrieve the most recent version of the snapshot received from the primary pool manager and use the snapshot to continue the project from the stage of the project indicated by the backup data. This may prevent failure of the project as a whole.

A backup pool manager may use various methods to determine that the primary pool manager has failed. In one example of such a method, the primary pool manager may transmit (e.g., periodically) a communication to the backup pool manager that indicates that the primary pool manager is working and has not failed, such as a heartbeat communication. The backup pool manager may determine that the primary pool manager has failed if the backup pool manager has not received a heartbeat communication for a certain predetermined period of time. Alternatively, a backup pool manager may also receive a communication from the primary pool manager itself (before it failed) or from a worker node that the primary pool manager has failed, for example because the primary pool manager has failed to communicate with the worker node.

Different methods may be performed to determine which backup pool manager of a set of backup pool manager will take over for failed primary pool manager 104 and become the new primary pool manager. For example, the new primary pool manager may be chosen based on a ranking or "hierarchy" of backup pool manager based on their unique identifiers. In an alternative embodiment, a backup pool manager may be assigned to be the new primary pool manager by another device in the session pool 102 or from an external device (e.g., a system infrastructure or an end user, such as a server or computer, controlling the session pool 102). In another alternative embodiment, the backup pool manager that takes over as the new primary pool manager may be designated based on bandwidth or other statistics about the session pool 102.

A worker node within the session pool 102 may also fail. If a worker node fails, work being performed by the failed worker node may be redistributed amongst the operational worker nodes. In an alternative embodiment, the primary pool manager may transmit a communication to each of the operable worker nodes still on the session pool 102 that each of the worker nodes should purposefully fail also. After each of the worker nodes fail, they may each retrieve their most recent saved checkpoint of their status and re-start the project from that checkpoint to minimize lost progress on the project being executed.

Figure 2:
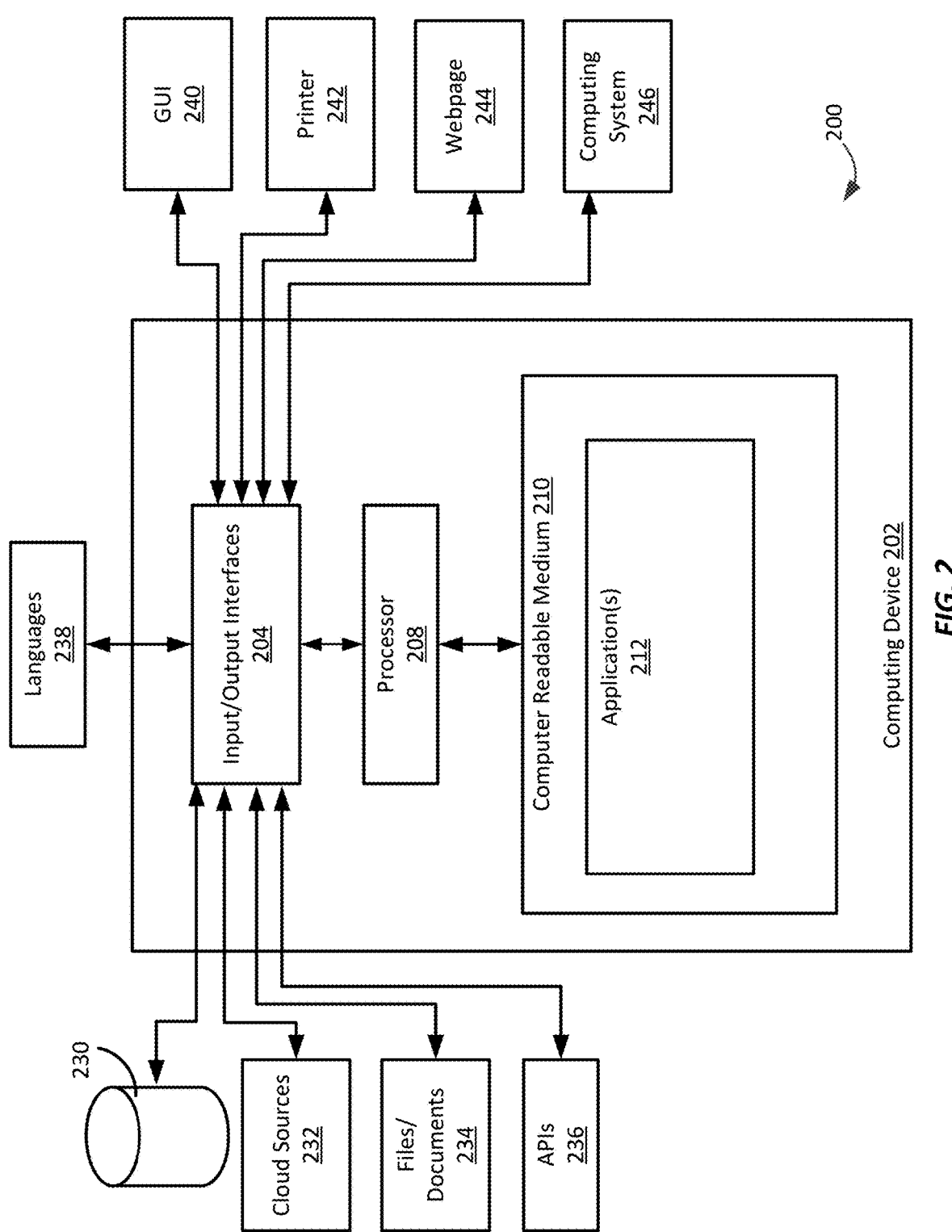
FIG. 2 illustrates a block diagram that provides an illustration of the hardware components of a computing system, according to at least one embodiment of the present technology.

While each device in FIG. 1 is shown as a single device, it will be appreciated that multiple devices may instead be used. FIG. 2 shows an example computing structure for a device in FIG. 2. FIG. 2 includes a computing device 202. The computing device 202 has a computer-readable medium 210 and a processor 208. Computer-readable medium 210 is an electronic holding place or storage for information so the information can be accessed by processor 208. The computer readable medium 210 is a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including, for example, memory sharing, message passing, token passing, and network transmission. Computer-readable medium 210 can include, but is not limited to, any type of random-access memory (RAM), any type of read only memory (ROM), any type of flash memory, etc. such as magnetic storage devices (e.g., hard disk, floppy disk, magnetic strips), optical disks (e.g., compact disc (CD), digital versatile disc (DVD)), smart cards, flash memory devices, etc.

Processor 208 executes instructions (e.g., stored at the computer-readable medium 210). The instructions can be carried out by a special purpose computer, logic circuits, or hardware circuits. In one or more embodiments, processor 208 is implemented in hardware and/or firmware. Processor 208 executes an instruction, meaning it performs or controls the operations called for by that instruction. The term "execution" is the process of running an application or the carrying out of the operation called for by an instruction. The instructions can be written using one or more programming language, scripting language, assembly language, etc. Processor 208 in one or more embodiments can retrieve a set of instructions from a permanent memory device and copy the instructions in an executable form to a temporary memory device that is generally some form of RAM, for example. Processor 208 operably couples with components of computing device 202 (e.g., input/output interface 204 and with computer readable medium 210) to receive, to send, and to process information.

For instance, in one or more embodiments, computing device 202 sends and/or receives information from one or more of databases 230, cloud sources 232, application programming interfaces 236 (API's), graphical user interfaces 240 (GUIs), printers 242, webpages 244, and computing systems 246. The input/output interface 204 may be configured to receive languages 238 (e.g., to communicate with other computing systems 246) or specific electronic files or documents 234 (e.g., inputs for building models or designing experiments). The input/output interface 204 may be a single interface (e.g., an output interface only to output reports to a printer 242), multiple interface (e.g., a graphical user interface 240 may be interactive and send and receive data over input/output interface 204), or a set of interfaces (e.g., to connect with multiple devices).

In one or more embodiments, computer-readable medium 210 stores instructions for execution by processor 208. In one or more embodiments, one or more applications stored on computer-readable medium 210 are implemented in software (e.g., computer-readable and/or computer-executable instructions) stored in computer-readable medium 210 and accessible by processor 208 for execution of the instructions.

Figure 3:
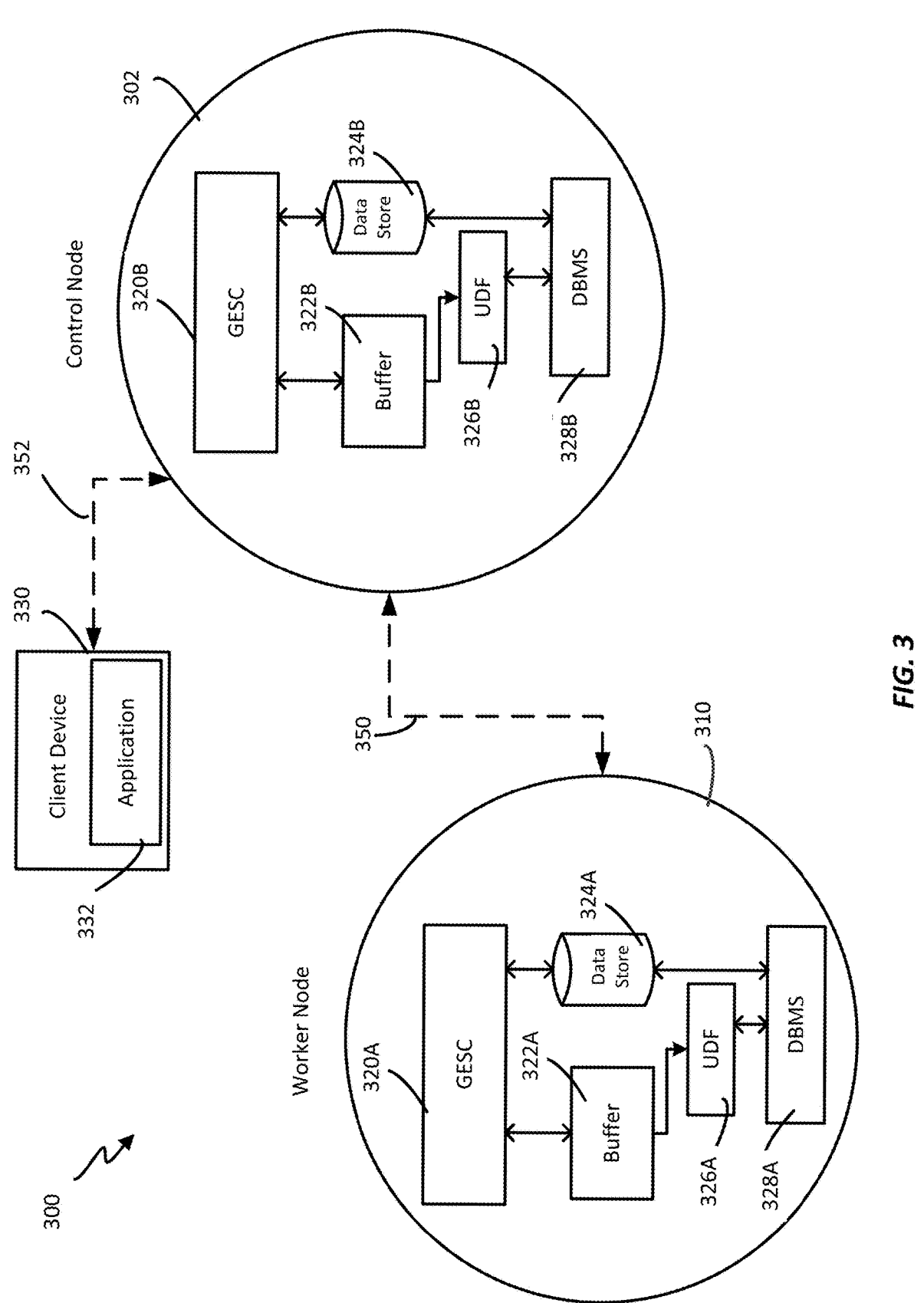
FIG. 3 illustrates a portion of a communications grid computing system, including a control node and a worker node, according to at least one embodiment of the present technology.

FIG. 3 illustrates a system 300 including a control node (e.g., pool manager 104 of FIG. 1) and a worker node (e.g., worker nodes 110 of FIG. 1), according to embodiments of the present technology. System 300 includes one control node (control node 302) and one worker node (worker node 310) for purposes of illustration but may include more worker and/or control node. The control node 302 is communicatively connected to worker node 310 via communication path 350. Therefore, control node 302 may transmit information (e.g., related to the session pool 102 or notifications), to and receive information from worker node 310 via path 350.

System 300 includes data processing nodes (e.g., control node 302 and worker node 310). Control node 302 and worker node 310 can include multi-core data processors. Each control node 302 and worker node 310 in this example includes a grid-enabled software component (GESC) 320 that executes on the data processor associated with that node and interfaces with buffer memory 322 also associated with that node. Each control node 302 and worker node 310 in this example includes a database management software (DBMS) 328 that executes on a database server (not shown) at control node 302 and on a database server (not shown) at worker node 310.

Each control node 302 and worker node 310 in this example also includes a data storage 324. Data storage 324, similar to network-attached data stores 120 in FIG. 1, are used to store data to be processed by the nodes in the computing environment. Data storage 324 may also store any intermediate or final data generated by the computing system after being processed, for example in non-volatile memory. However, in certain embodiments, the configuration of the system 300 allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the pool receives queries (e.g., ad hoc) from a client device 330 and when responses, which are generated by processing large amounts of data, need to be generated quickly or on-the-fly. In such a situation, the pool may be configured to retain the data within memory so that responses can be generated at different levels of detail and so that a client may interactively query against this information.

Each control node 302 and worker node 310 in this example also includes a user-defined function (UDF) 326. The UDF 326 provides a mechanism for the DBMS 328 to transfer data to or receive data from the database stored in the data storage 324 that are managed by the DBMS. For example, UDF 326 can be invoked by the DBMS 328 to provide data to the GESC 320 for processing. The UDF 326 may establish a socket connection (not shown) with the GESC 320 to transfer the data. Alternatively, the UDF 326 can transfer data to the GESC 320 by writing data to shared memory accessible by both the UDF 326 and the GESC 320.

The GESC 320 at the control node 302 and worker node 310 may be connected via a network. Therefore, control node 302 and worker node 310 can communicate with each other via the network using a predetermined communication protocol such as, for example, the Message Passing Interface (MPI). Each GESC 320 can engage in point-to-point communication with the GESC at another node or in collective communication with multiple GESCs via the network. The GESC 320 at each node may contain identical (or nearly identical) software instructions. Each control node 302 and worker node 310 may be configured to operate as either a pool manager or a worker node. The GESC 320B at the control node 302 can communicate, over a communication path 352, with a client device 330. More specifically, control node 302 may communicate with client application 332 hosted by the client device 330 to receive queries and to respond to those queries after processing large amounts of data.

DBMS 328 may control the creation, maintenance, and use of database or data structure (not shown) within control node 302 and worker node 310. The database may organize data stored in data storage 324. The DBMS 328 at control node 302 may accept requests for data and transfer the appropriate data for the request. With such a process, collections of data may be distributed across multiple physical locations. In this example, each control node 302 and worker node 310 stores a portion of the total data managed by the management system in its associated data storage 324.

Furthermore, the DBMS 328 may be responsible for protecting against data loss using replication techniques. Replication includes providing a backup copy of data stored on one node on one or more other nodes. Therefore, if one node fails, the data from the failed node can be recovered from a replicated copy residing at another node. Data or status information for each node in the session pool 102 may also be shared with each node on the pool.

Figure 4:
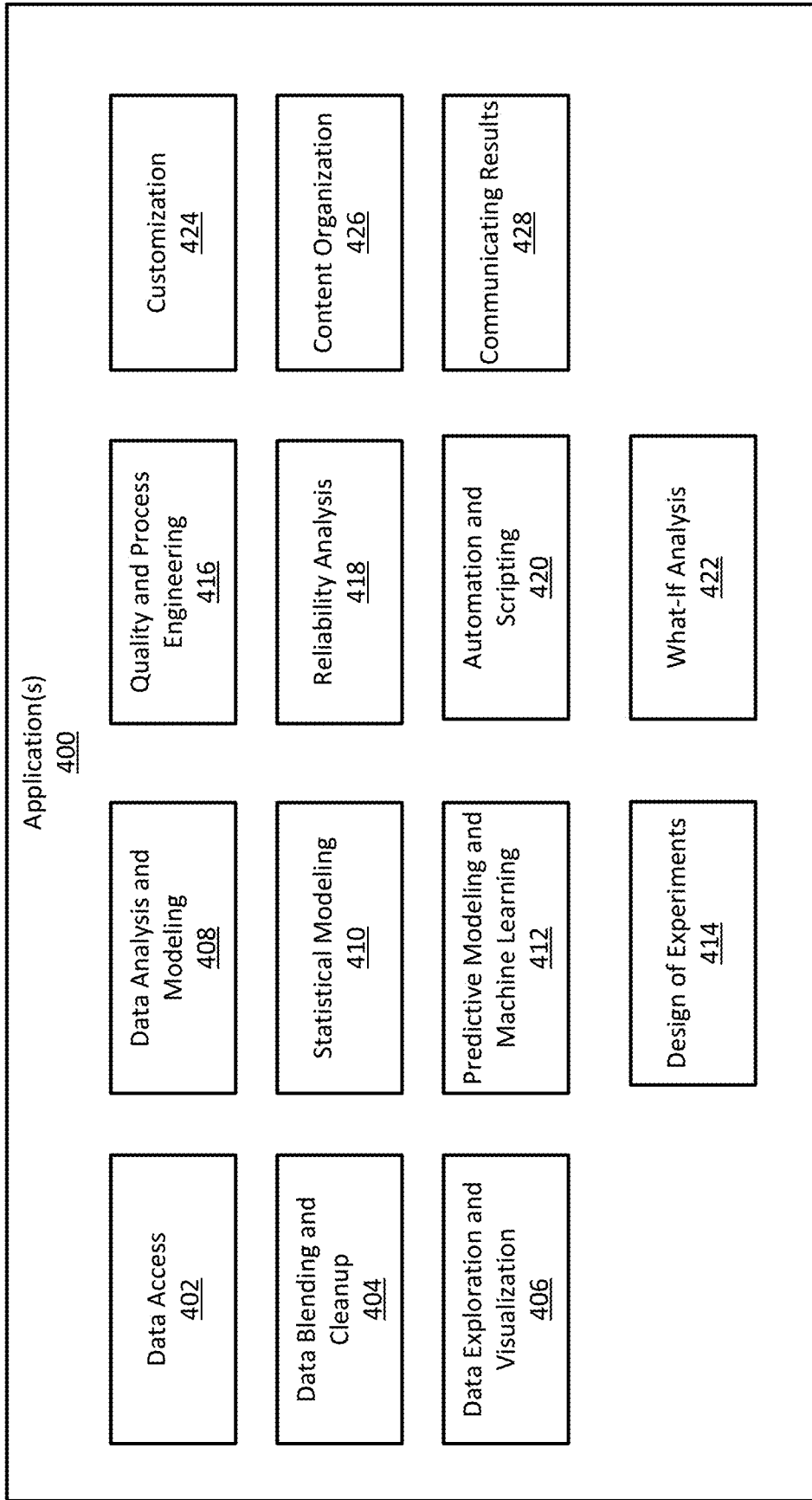
FIG. 4 illustrates a block diagram of example applications, according to at least one embodiment of the present technology.

FIG. 4 provides example applications 400 (e.g., applications executed by a computing device 202, worker node 310, or control node 302) for performing one or more tasks or operations.

For example, data access operations 402 can be used for accessing data from different sources (e.g., importing and/or reading Excel files, flat files, relational databases, APIs, R, Python, and SAS® files and databases). For instance, data can be imported for data visualization, exploration and analysis. Data can be formatted or optimized. For instance, data blending and cleanup operations 404 can be used to remove complexity (e.g., in text, images and functions data) and for screening data (e.g., screening data for outliers, entry errors, missing values and other inconsistencies that can compromise data analysis). This can be useful for visual and interactive tools. Data can also be transformed, blended, grouped, filtered, merged into a single table or into subsets, or otherwise arranged for a particular scenario.

In one or more embodiments, one or more applications 400 include data exploration and visualization operations 406 that can be used to support plot and profiler tools. For instance, plot tools can be used to create data plots (e.g., to plot data to spot patterns and patterns that do not fit a trend). Some example plots include bubble plots, scatter plots (matrix and 3D), parallel plots, cell plots, contour plots, ternary plots, and surface plots. Profilers are tools that can be used to create a specialized set of plots in which changing one plot changes the other plots. For instance, profiling is an approach to generate visualizations of response surfaces by seeing what would happen if a user changed just one or two factors at a time. Profiler tools can be used to create interactive profiles of data (e.g., to explore and graph data dynamically and uncover hidden relationships between graphed data or interface with linked data, to interpret and understand the fit of equations to data, and to find factor values to optimize responses). Some example profiler tools include prediction profiler, contour profiler, surface profiler, mixture profiler, custom profiler, and excel profiler. A prediction profiler can be used to show vertical slices across each factor, holding other factors at a current value. A contour profiler allows horizontal slices showing contour lines for two factors at a time. A surface profiler generates three-dimensional plots for two factors at a time, or contour surface plot for 3 factors at a time. A mixture profiler is a contour profiler for mixture of factors. A custom profiler is a numerical optimizer. An excel profiler allows for visualization of models or formulas stored in electronic worksheets. Accordingly, profiler tools can allow for one or more of simulation, surface visualization, optimization, and desirability studies. Graphs (e.g., from plot or profiler tools) can be exported to electronic or print reports for presenting findings. Further, data exploration and visualization operations 406 can include text exploration such as computer extraction of symbols, characters, words and phrases; or computer visualization such as to organize symbols, characters, words and phrases to uncover information regarding a text or classify the text.

In one or more embodiments, one or more applications 400 include data analysis and modeling operations 408 can be used to analyze one or many variables or factors in linked analysis. Analysis results may be linked with specific graphs designed for different types of data or metrics (e.g., graphs related to histograms, regression modeling and distribution fitting). Data analysis and modeling can be performed real-time (or just-in-time). For instance, applications 400 can included statistical modeling operations 410. For instance, statistical modeling operations 410 can be used for a diversity of modeling tasks such as univariate, multivariate and multifactor. Data can be transformed from its collected form (e.g., text or functional form) and data can be used for building models for better insights (e.g., discovery trends or patterns in data). As another example, one or more applications 400 can include predictive modeling and machine learning operations 412 to build models using predictive modeling techniques, such as regression, neural networks and decision trees. The operations 412 can be used to fit multiple predictive models and determine the best performing model with model screening. Validation (e.g., cross-validation and k-fold cross-validation) can be used (e.g., to prevent over-fitting or to select a best model). Machine learning methods can be used by the user without having to write code and tune algorithms. Examples of machine learning techniques are described in more detail with respect to FIGS. 5 and 6).

In one or more embodiments, one or more applications 400 include design of experiments (DOE) operations 414 used to create designs for experiments that provide test conditions for one or more factors tested in the experiment. For example, the design of experiments operations 414 can be used to create optimally designed experiments, efficient experiments to meet constraints, process limitations and budget, and/or screening designs to untangle important effects between multiple factors. DOE operations 414 can also be used for evaluating designs (e.g., design diagnostic measures such as efficiency metrics).

In one or more embodiments, one or more applications 400 include quality and process engineering operations 416 to track and visualize quality and processes. For instance, the quality and process engineering operations 416 can generate charts to explore root causes of quality or process problems (e.g., causes of variation in manufacturing processes and drill down into problem processes). Additionally, or alternatively, they can be used to generate notifications for metrics that exceed a threshold such as an out-of-control signal or a control chart warning. Additionally, or alternatively, they can be used to study the capability and performance of one or more variables to identify processes that are not meeting user-defined goals. Objective data from processes or consumer data can be used to release better products and react to market trends.

In one or more embodiments, one or more applications 400 include reliability analysis operations 418. For example, in manufacturing, reliability analysis tools can be used to prevent failure, improve warranty or product performance, find and address important design vulnerabilities, and pinpoint defects in materials or processes. Reliability analysis tools can also be used to determine how to reduce or improve these issues (e.g., by identifying trends and outliers in data and model predictions). What-if Analysis operations 422 can be used to demonstrate patterns of predicted responses and the effect of each factor on the response with scenario analysis. For example, a graphical user interface can be used for a user to put in different inputs, assumptions or constraints for a system and observe responses or effects. For instance, in a measurement system analysis analyzing whether parts would be in-specification, different estimated variances between parts and operators testing the parts could be varied to determine the effect on modeled output for the measurement system analysis.

In one or more embodiments, one or more applications 400 include automation and scripting operations 420. For example, automation can allow code-free access for a user to automation routines all the way up to completely customized applications (e.g., code free access to SAS®, MATLAB®, Python® and R routines). For example, a design created for experiments can be automated such that automatic testing is performed for the design.

In one or more embodiments, one or more applications 400 include operations for greater user control and interaction. For instance, customization operations 424 can be used for user customization (e.g., mass customizations, and customizations of graphics, statistics, and default views). As another example, content organization operations 426 can be used to organize data (e.g., translate statistical results to a simplified view to communicate findings and organize, summarize, and document content to better aid the accountability and reproducibility of projects). As another example, the communicating results operations 428 can be used for presentation of results, models, or other output from one or more applications 400 (e.g., presented in print, graphical user interface, or web-based versions).

In one or more embodiments, fewer, different, and additional components can be incorporated into computing device 202. In one or more embodiments, the input/output interface has more than one interface that uses the same or different interface technology.

In one or more embodiments, the one or more applications 400 can be integrated with other analytic or computing tools not specifically shown here. For instance, one or more applications are implemented using or integrated with one or more software tools such as JMP®, Base SAS, SAS® Enterprise Miner™, SAS/STAT®, SAS® High Performance Analytics Server, SAS® Visual Data Mining and Machine Learning, SAS® LASR™ SAS® In-Database Products, SAS® Scalable Performance Data Engine, SAS® Cloud Analytic Services, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, and SAS/IML®.

Figure 5:
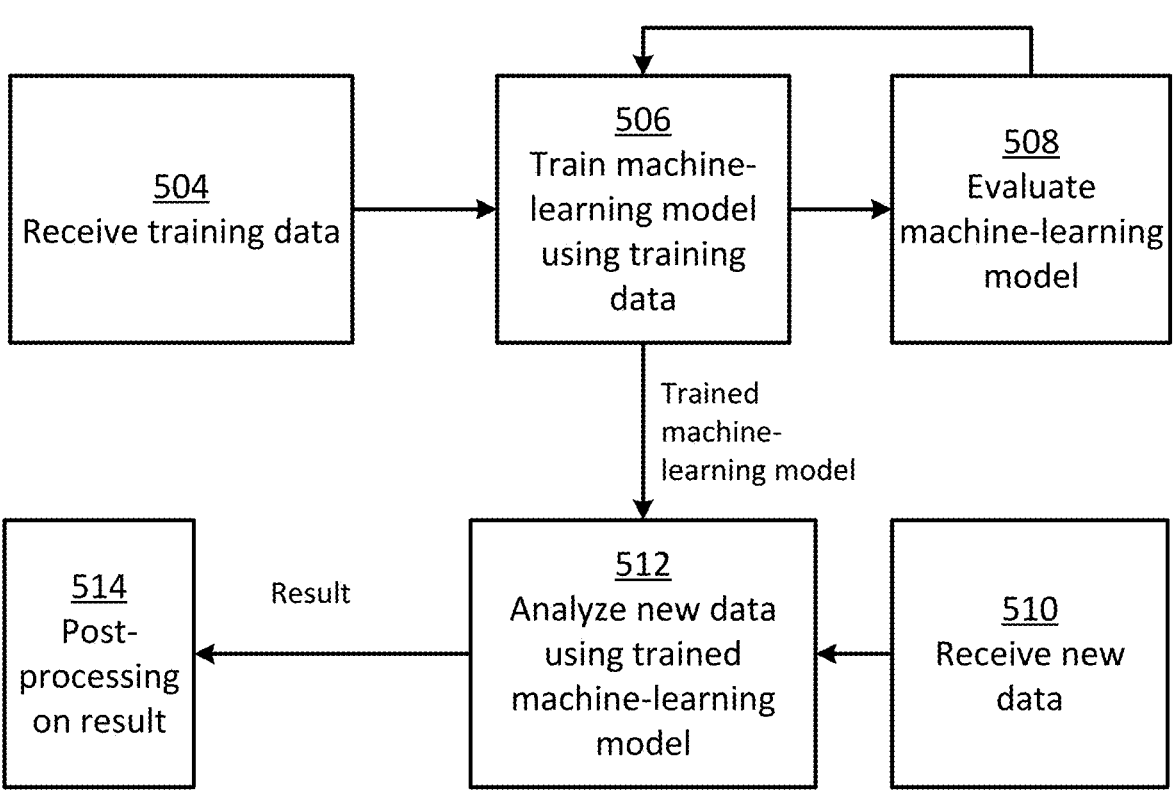
FIG. 5 illustrates a flow chart of an example of a process for generating and using a machine-learning model, according to at least one embodiment of the present technology.

One or more embodiments are useful for generating and using machine-learning models. FIG. 5 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector operator (LASSO) classifiers, and support vector machines; (iv) clusterers, such as k-means clustering, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, North Carolina.

Machine-learning models construction can be at least partially automated (e.g., with little or no human involvement) in a training process. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 5.

In block 504, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 506, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 508, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 506, where the machine-learning model can be further trained using additional training data or otherwise modified to improve accuracy. If the machine-learning model has an adequate degree of accuracy for the particular task, the process can continue to block 510.

In block 510, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 512, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 514, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 6:
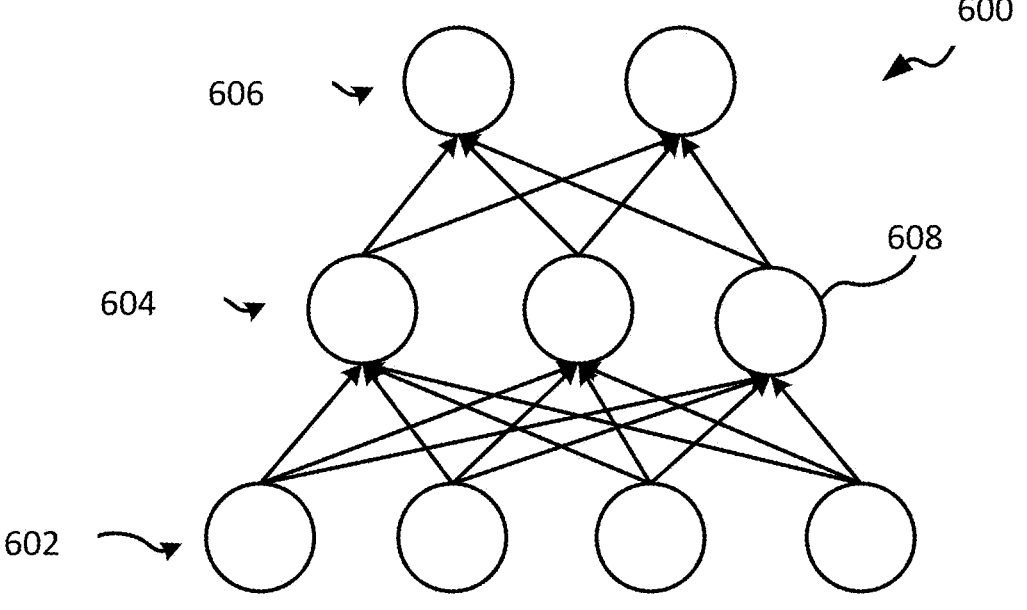
FIG. 6 illustrates an example of a machine-learning model as a neural network, according to at least one embodiment of the present technology.

A more specific example of a machine-learning model is the neural network 600 shown in FIG. 6. The neural network 600 is represented as multiple layers of interconnected neurons, such as neuron 608, that can exchange data between one another. The layers include an input layer 602 for receiving input data, a hidden layer 604, and an output layer 606 for providing a result. The hidden layer 604 is referred to as hidden because it may not be directly observable or have its input directly accessible during the normal functioning of the neural network 600. Although the neural network 600 is shown as having a specific number of layers and neurons for exemplary purposes, the neural network 600 can have any number and combination of layers, and each layer can have any number and combination of neurons.

The neurons and connections between the neurons can have numeric weights, which can be tuned during training. For example, training data can be provided to the input layer 602 of the neural network 600, and the neural network 600 can use the training data to tune one or more numeric weights of the neural network 600. In some examples, the neural network 600 can be trained using backpropagation. Backpropagation can include determining a gradient of a particular numeric weight based on a difference between an actual output of the neural network 600 and a desired output of the neural network 600. Based on the gradient, one or more numeric weights of the neural network 600 can be updated to reduce the difference, thereby increasing the accuracy of the neural network 600. This process can be repeated multiple times to train the neural network 600. For example, this process can be repeated hundreds or thousands of times to train the neural network 600.

In some examples, the neural network 600 is a feed-forward neural network. In a feed-forward neural network, every neuron only propagates an output value to a subsequent layer of the neural network 600. For example, data may only move one direction (forward) from one neuron to the next neuron in a feed-forward neural network.

In other examples, the neural network 600 is a recurrent neural network. A recurrent neural network can include one or more feedback loops, allowing data to propagate in both forward and backward through the neural network 600. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 600 operates by receiving a vector of numbers from one layer; transforming the vector of numbers into a new vector of numbers using a matrix of numeric weights, a nonlinearity, or both; and providing the new vector of numbers to a subsequent layer of the neural network 600. Each subsequent layer of the neural network 600 can repeat this process until the neural network 600 outputs a final result at the output layer 606. For example, the neural network 600 can receive a vector of numbers as an input at the input layer 602. The neural network 600 can multiply the vector of numbers by a matrix of numeric weights to determine a weighted vector. The matrix of numeric weights can be tuned during the training of the neural network 600. The neural network 600 can transform the weighted vector using a nonlinearity, such as a sigmoid tangent or the hyperbolic tangent. In some examples, the nonlinearity can include a rectified linear unit, which can be expressed using the following equation:

$$y = \max(x, o)$$

where y is the output and x is an input value from the weighted vector. The transformed output can be supplied to a subsequent layer, such as the hidden layer 604, of the neural network 600. The subsequent layer of the neural network 600 can receive the transformed output, multiply the transformed output by a matrix of numeric weights and a nonlinearity, and provide the result to yet another layer of the neural network 600. This process continues until the neural network 600 outputs a final result at the output layer 606.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the session pool 102 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. Furthermore, these processors may also be employed in heterogeneous computing architectures with a number of and a variety of different types of cores, engines, nodes, and/or layers to achieve various energy efficiencies, chip-level thermal processing considerations, processing speed improvements, data communication speed improvements, and/or data efficiency targets and improvements throughout various parts of the system when compared to a homogeneous computing architecture that employs CPUs for general purpose computing.

Associated Processes

FIG. 7 illustrates one embodiment of method 700 generating a short run control chart based on drag-and-drop inputs detected at a user interface. It shall be appreciated that other embodiments contemplated within the scope of the present disclosure may involve more processes, fewer processes, different processes, or a different order of processes than illustrated in FIG. 7.

As will be described in more detail herein, the short run control chart(s) generated via method 700 offer numerous technical advantages over short run control charts generated by conventional solutions. Firstly, in some embodiments, the short run control charts generated herein plot data points of multiple categories (e.g., parts, products, etc.) on a single chart. This contrasts with conventional solutions that either generate separate short run control charts for each category (e.g., part, product, etc.) in a dataset or split a short run control chart into multiple phases corresponding to different categories of the dataset (e.g., distinct segments that display all data points corresponding to a specific category, product, or part). Generating separate short run control charts for each category of a dataset is often undesirable as it leads to isolated data views that can obscure overarching trends in the dataset and prevent a comprehensive understanding of the modeled activity/process. Similarly, splitting the short run control chart into phases corresponding to the categories of a dataset may also be undesirable as it disrupts the chronological sequence of the dataset.

Secondly, in some embodiments, method 700 displays user interfaces that enable short run control charts to be generated interactively via drag-and-drop inputs. Interactively generating a short run control chart via drag-and-drop inputs offers numerous technical advantages over conventional solutions. For example, it enables rapid experimentation by allowing users to easily modify properties of the short run control chart and immediately preview (e.g., observe) the results of such operations. Additionally, the drag-and-drop functionality makes building complex short run control charts available to users with various levels of technical expertise—including users who may have minimal or no prior experience in statistical process control—and eliminates the need for users to perform complex data manipulation tasks typically required by conventional techniques.

Thirdly, in some embodiments, method 700 is compatible with a variety of datasets. For example, the dataset(s) used by method 700 can include any arbitrary number of categories (e.g., 1, 2, 3, . . . , N categories). Furthermore, in some embodiments, the entries (e.g., rows) of the dataset(s) can be ordered in any manner. For example, the dataset(s) used by method 700 can alternate between rows for any number of categories (e.g., switch between rows associated with categories A, B, C, D, and so on, in any sequence or combination). Additionally, in some embodiments, the ordering of the rows is unrestricted (e.g., A-B-A-C-B-A, C-A-B-A, B-C-B-A, etc.).

Fourthly, in some embodiments, method 700 dynamically responds to changes in the dataset. For instance, in some embodiments, method 700 may automatically adjust the short run control chart to reflect additions or deletions to any number of columns and/or rows in the dataset. Lastly, in some embodiments, the short run control chart generated by method 700 enables statistical tests (e.g., Nelson tests, Westgard runs, etc.) to be conducted across datapoints associated with different categories of the dataset. It shall be noted that the above-described technical benefits are only a subset of the advantages of method 700 and that a person of ordinary skill in the art will appreciate further advantages of method 700 throughout the disclosure.

As shown in FIG. 7, process 710 of method 700 may display a user interface that is configured to create a short run control chart from a dataset. The term "short run control chart," as generally used herein, may refer to a type of statistical process control (SPC) chart that plots observations of variables or attributes for multiple products, processes, categories, parts, and/or the like. It shall be appreciated that this feature/characteristic may distinguish a short run control chart from other types of statistical process control charts as such other types of control charts are typically configured to display observations for a single product or process.

Additionally, as generally used herein, short control charts build on Shewhart control charts—described in more detail below below—by centering or standardizing data by predetermined target and sigma values according to a product level. Usages of short run controls charts are increasingly more common and necessary for monitoring high throughput and Just in Time manufacturing practices where multiple products with different characteristics are made on the same manufacturing line in small (short) runs. Traditional Shewhart control chart methods fail to sufficiently characterize these processes which invalidate statistical control charts tests.

It shall be noted that nearly 100 years ago, Walter Shewhart recommended plotting manufacturing data on a chart with +/−3 sigma limits to monitor the stability of the manufacturing process, improve quality and detect out of control situations quickly. If a point on the chart is above or below the limits, that point, and possibly the entire process is out of control. As these charts are fundamentally designed to quickly and visually reveal whether a process is in-control (stable) or out of control, they became known as "control charts." Over time, nearly all manufacturing facilities, and many other industries have incorporated using Shewhart control charts to monitor a variety of processes at many levels of an organization.

Furthermore, as generally used herein, the dataset that method 700 uses to create the short run control chart may refer to any suitable dataset structured to include observations (e.g., rows of data) for multiple products, categories, parts, and/or the like. For example, in some embodiments, method 700 may generate a short run control chart for dataset 822 illustrated in FIG. 8E. Dataset 822, in the example of FIG. 8E, is a multi-product dataset that includes one or more rows 826A-826S and one or more columns 824A-824F. Specifically, in the example of FIG. 8E, column 824F indicates that rows 826A-826L correspond to "Product A" (e.g., a first category) and rows 826M-826S correspond to "Product B" (e.g., a second category).

Additionally, as illustrated in FIG. 8E, rows 826A-826S include values for columns 824A-824E. Specifically, in this example, the values stored within a respective row of dataset 822 include values observed during a respective manufacturing run on a manufacturing production line. However, it shall be noted that the above example is not intended to be limiting and that dataset 822 may include additional columns or rows, fewer columns or rows, and/or different columns or rows without departing from the scope of the disclosure. Furthermore, it shall also be noted that the rows of dataset 822 may correspond to various other categories beyond products without departing from the scope of the disclosure, such as patient groups, product types, or any data category suitable for short run control chart generation.

In some embodiments, as illustrated in FIG. 7, a user interface that is configured to create a short run control chart may include a real-time view of the short run control chart (710A) and a plurality of drag-and-drop graph zones displayed in association with the real-time view of the short run control chart (710B). For instance, in FIG. 8A, process 710 displays a user interface 800 that includes a real-time view 808 of a short run control chart (as indicated by element 806) and a plurality of drag-and-drop graph zones 804A-804E displayed in association with real-time view 808. As will be described in more detail herein, method 700 may interactively update (e.g., display) new data within real-time view 808 as drag-and-drop inputs are detected at drag-and-drop graph zones 804A-804E. It shall be noted that the term "real-time" is not intended to be limiting and that method 700 may add new data to real-time view 808 in real-time or near real-time.

Updating real-time view 808 in real-time, as generally used herein, may refer to updating real-time view 808 with minimal delay (e.g., 0.5 milliseconds, 1 millisecond, etc.) after detecting drag-and-drop input at a respective drag-and-drop graph zone 804A, 804B, 804C, 804D, and/or 804E. Conversely, updating real-time view 808 in near real-time, as generally used herein, may refer to updating real-time view 808 with a delay (e.g., 1 second, 2 seconds, etc.) after detecting drag-and-drop input at a respective drag-and-drop graph zone 804A, 804B, 804C, 804D, and/or 804E.

Figure 8A:
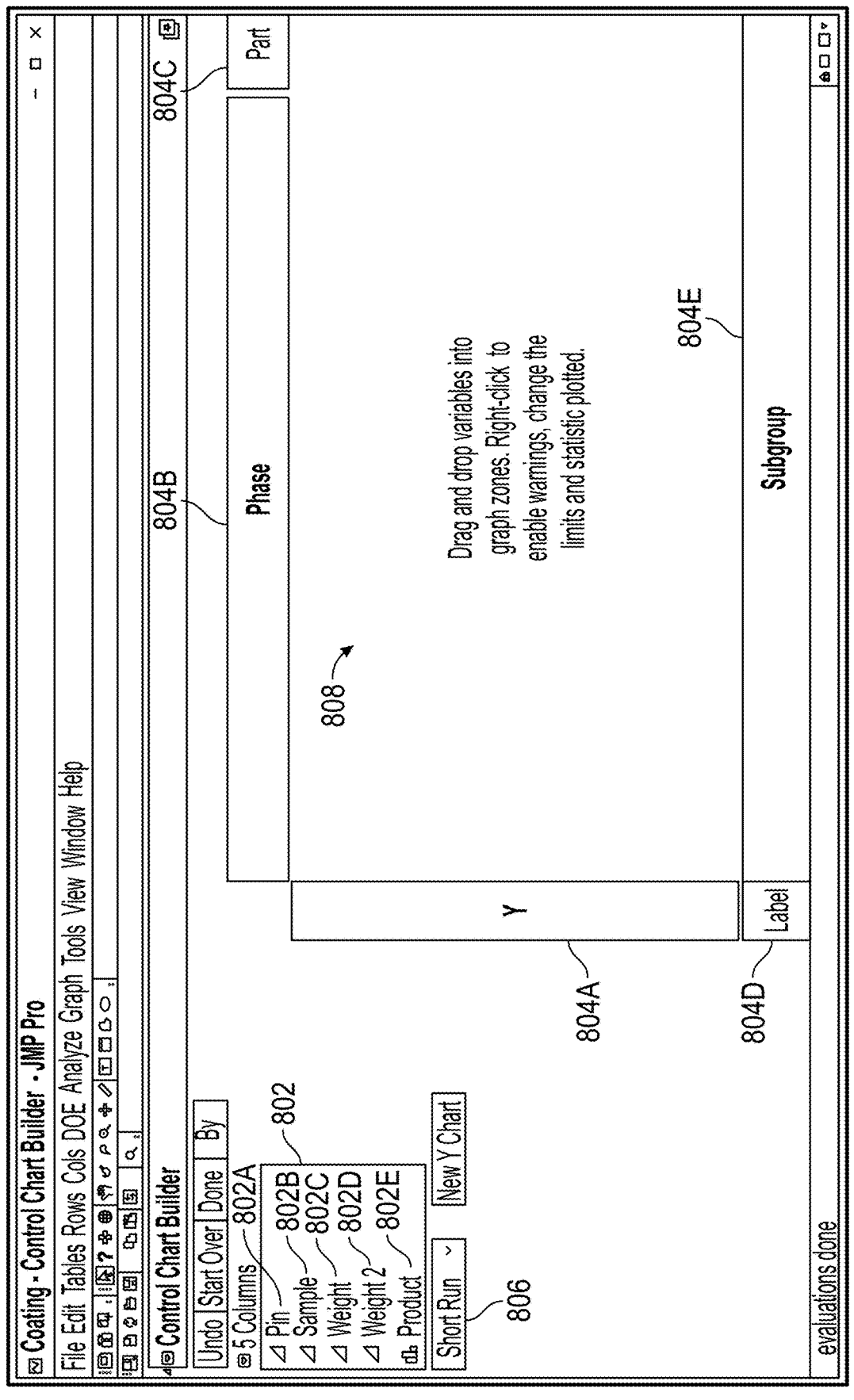
FIGS. 8A-8D illustrate example graphical user interfaces for interactively generating a short run control chart, according to at least one embodiment of the present technology.

Specifically, in the example of FIG. 8A, drag-and-drop graph zones 804A-804E include a y-axis configuration drag-and-drop zone 804A, a phase configuration drag-and-drop zone 804B, a part variable drag-and-drop graph zone 804C, a label configuration drag-and-drop zone 804D, and a subgroup configuration drag-and-drop zone 804E. Method 700, as described in more detail with respect to process 720, may use drag-and-drop input detected at y-axis configuration drag-and-drop zone 804A to define a y-axis of the short run control displayed via real-time view 808. Conversely, in some embodiments, method 700 may use drag-and-drop input detected at phase configuration drag-and-drop zone 804B to define phases of the short run control displayed via real-time view 808.

Furthermore, in some embodiments, method 700 may use drag-and-drop input detected at part configuration drag-and-drop zone 804C to identify a column of a dataset (e.g., dataset 822) that stores the corresponding category, part, or product data for the rows of the dataset. Method 700, in some embodiments, may use drag-and-drop input detected at label configuration drag-and-drop zone 804D to define a label for the short run control chart displayed via real-time view 808. Lastly, in some embodiments, method 700 may use drag-and-drop input detected at subgroup configuration drag-and-drop zone 804E to define a subgrouping variable or column for the short run control chart displayed via real-time view 808. It shall be noted that the example illustrated in FIG. 8A is not intended to be limiting and that user interface 800 may display additional, fewer, or different drag-and-drop graph zones without departing from the scope of the disclosure.

Referring to FIG. 7, process 720 of method 700 may detect, via the plurality of drag-and-drop graph zones, a plurality of drag-and-drop inputs. A drag-and-drop input, as generally used herein, may refer to user input that selects a user interface element, drags the user interface element to a respective drag-and-drop graph zone (e.g., drag-and-drop graph zone 804A, 804B, 804C, 804D, or 804E), and releases (e.g., drops) the user interface element into the respective drag-and-drop graph zone. Various non-limiting examples of process 720 will now be described with reference to FIGS. 8B and 8D.

Figure 8B:
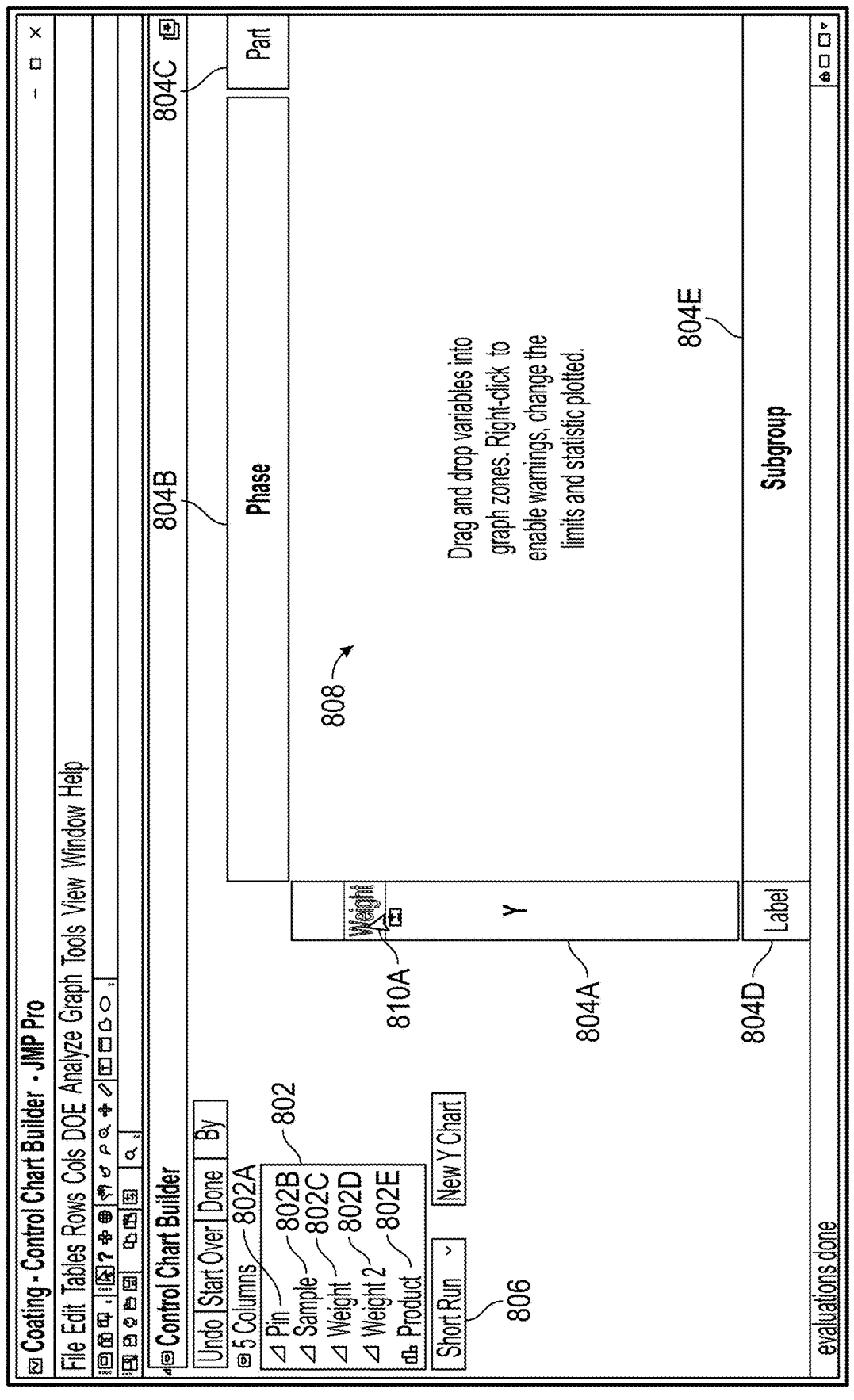

As illustrated in FIG. 8B, in some embodiments, user interface 800 may include a column selection region 802.

Column selection region 802 may include a plurality of draggable items that are movable to drag-and-drop graph zones 804A-804E. For instance, as shown in FIG. 8B, column selection region 802A includes a plurality of draggable items 802A-802E. Specifically, in such example, draggable items 802A-802D correspond to columns 824A-824D in FIG. 8E, respectively, and draggable item 802E corresponds to column 824F in FIG. 8E. It shall be noted that the above example is not intended to be limiting and that, if user interface 800 was being displayed for a different dataset (e.g., a dataset other than dataset 822 in FIG. 8E), column selection region 802 would analogously include draggable items corresponding to columns in that dataset.

In some embodiments, as shown in FIG. 7, the plurality of drag-and-drop inputs detected via process 720 may include a first drag-and-drop input that assigns a first column of the dataset into a y-axis configuration drag-and-drop graph zone of the plurality of drag-and-drop graph zones (720A). For instance, in FIG. 8B, process 720 detects a first drag-and-drop input 810A that selects and moves draggable item 802C to y-axis configuration drag-and-drop graph zone 804A. If process 720 further detects the release (e.g., drop) of draggable item 802C into y-axis configuration drag-and-drop graph zone 804A, process 720 may, in turn, assign column 824C illustrated in FIG. 8E to y-axis configuration drag-and-drop graph zone 804A (e.g., because draggable item 802C corresponds to column 824C as previously noted above). Conversely, if process 720 further detects the release of draggable item 802C following movement of draggable item 802C outside of y-axis configuration drag-and-drop graph zone 804A, process 720 may forgo assigning column 824C illustrated in FIG. 8E to y-axis configuration drag-and-drop graph zone 804A.

Furthermore, as also shown in FIG. 7, the plurality of drag-and-drop inputs detected via process 720 may include a second drag-and-drop input that assigns a second column of the dataset into a part variable drag-and-drop graph zone of the plurality of drag-and-drop graph zones (720B). For instance, in the example of FIG. 8D, process 720 detects a second drag-and-drop input 810B that selects and moves draggable item 802E to part variable drag-and-drop graph zone 804C. If process 720 detects the release (e.g., drop) of draggable item 802E into part variable drag-and-drop graph zone 804B, process 720 may, in turn, assign column 824F in FIG. 8E to part variable drag-and-drop graph zone 804B (e.g., because draggable item 802E corresponds to column 824F as previously noted above). Conversely, if process 720 detects the release of draggable item 802E following movement of draggable item 802E outside of part variable drag-and-drop graph zone 804C, process 720 may forgo assigning column 824F to part variable drag-and-drop graph zone 804C.

Referring to FIG. 7, process 730 of method 700 may include converting values from the first column of the dataset into location data points. The term "first column of the dataset," as generally used herein, may refer to the column that process 720 assigned to y-axis configuration zone 804A. For instance, in the example of FIG. 8B, the first column of the dataset corresponds to column 824C in FIG. 8E because, as described above, process 720 detected drag-and-drop input 810A moving and—optionally—releasing corresponding draggable item 802C into y-axis configuration drag-and-drop zone 804A. However, in other examples of process 730, the first column of the dataset may instead correspond to column 824A, 824B, 824D, or 824F if the draggable item 802A, 802B, 802D, or 802E were instead moved and released into y-axis configuration drag-and-drop zone 804A, respectively.

In some embodiments, method 700 may execute process 730 before process 720 detects a release (e.g., completion) of a drag-and-drop input at part variable drag-and-drop graph zone 804C. For example, in the example of FIG. 8D, method 700 may begin execution of process 730 when process 720 detects drag-and-drop input 810B hovering draggable item 802E over part variable drag-and-drop graph zone 804C. As will be described with reference to process 740, executing process 730 in this manner may enable method 700 to visually preview anticipated changes to real-time view 808 if drag-and-drop input 810B drops draggable item 802E into part variable drag-and-drop graph zone 804C.

Figure 8C:
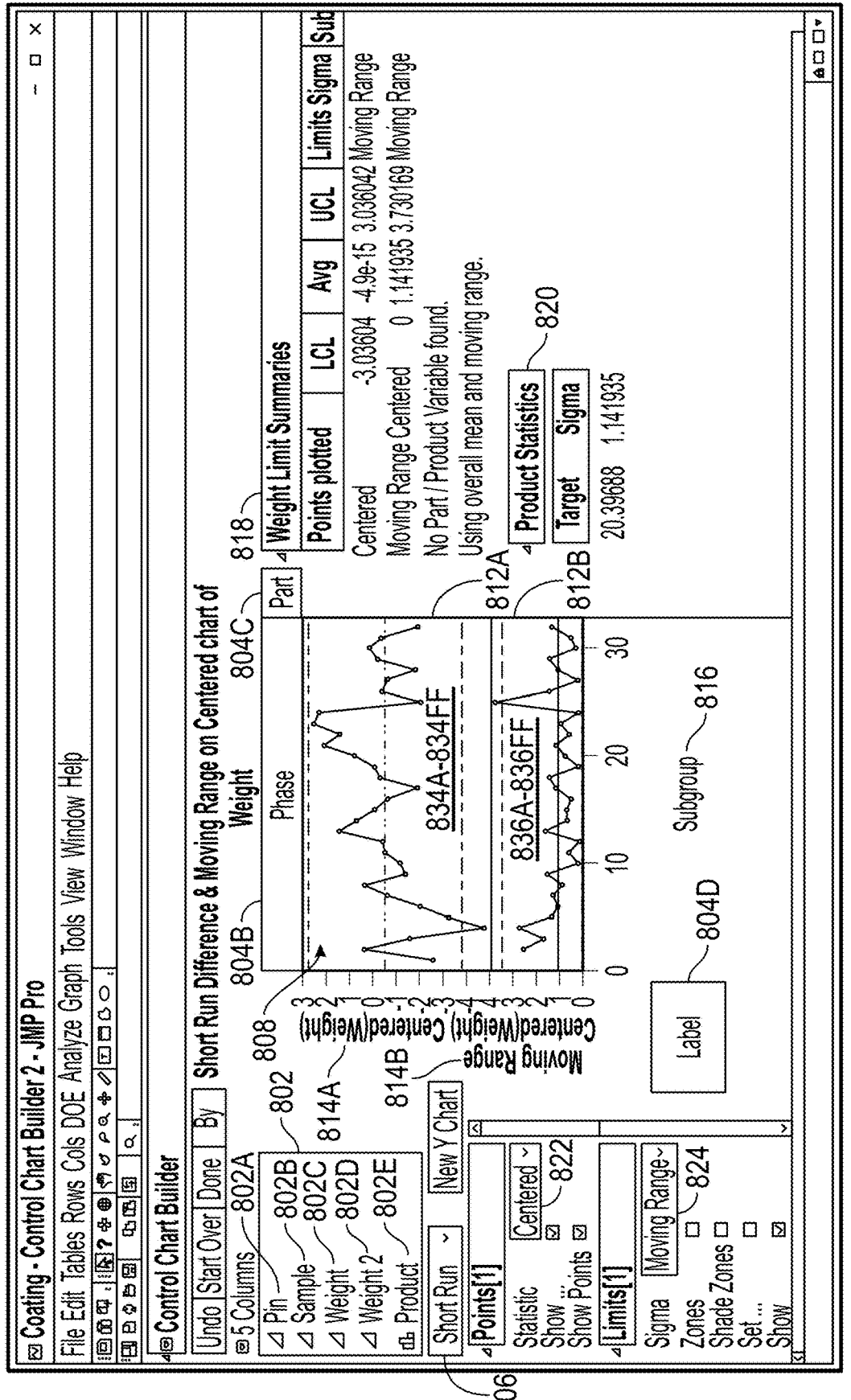
Figure 8D:
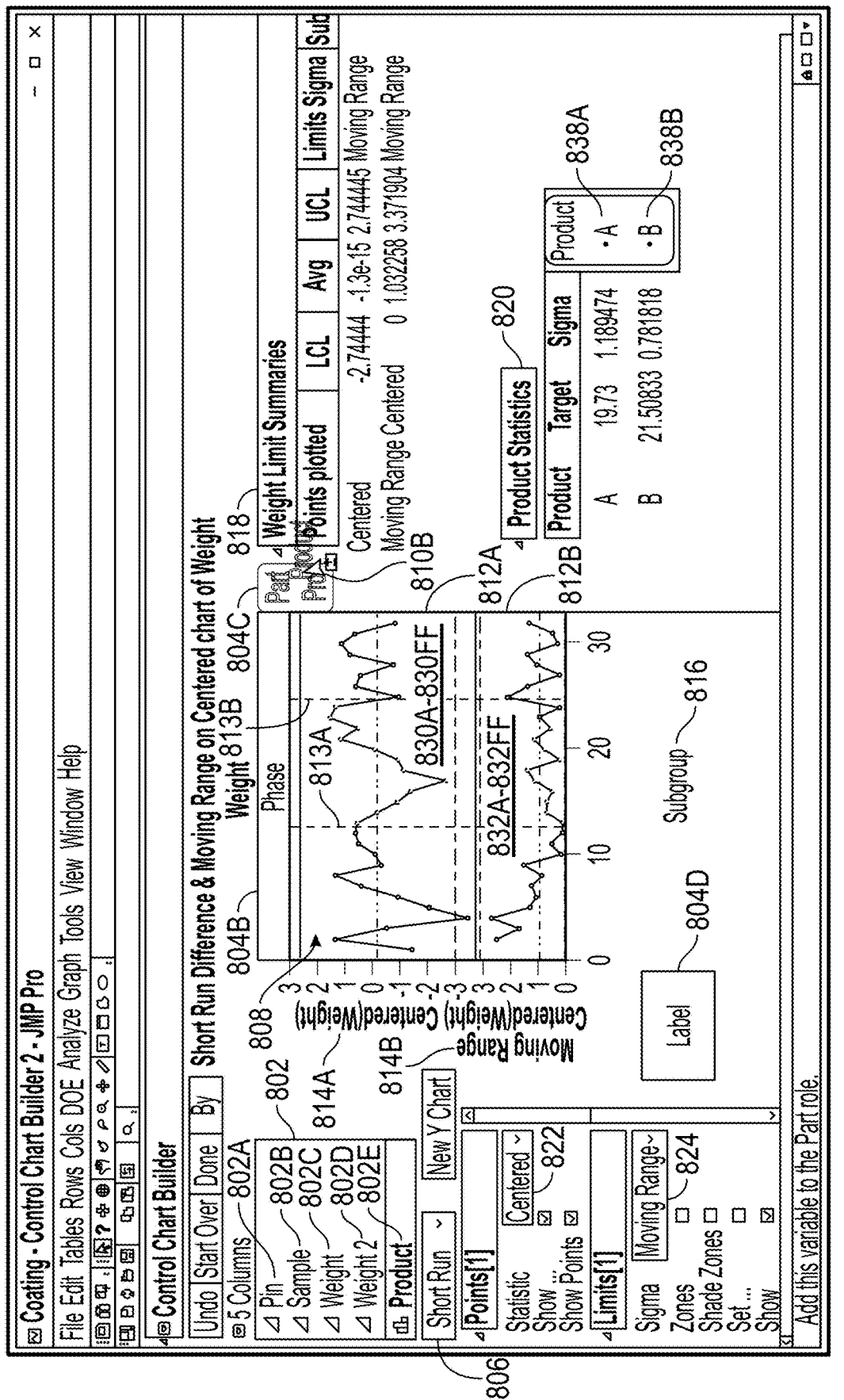

Additionally, as shown in FIG. 8D, process 730 computes a plurality of location data points 830A-830FF that are, in turn, presented (e.g., displayed) in real-time view 808 via process 740 of method 700. Specifically, in FIG. 8D, location data points 830A-830FF represent centered location data points for the values illustrated in column 824C of FIG. 8E. Centered location data points, as generally used herein, may refer to data points that have been adjusted such that a mean of the data points equals or approximates zero (0) (e.g., as indicated by table 818). It shall also be noted that, in other embodiments, process 730 may analogously compute location data points for a different column of dataset 822 (e.g., when drag-and-drop input 810A drags a different draggable item to y-axis configuration drag-and-drop zone 804A than illustrated in FIG. 8B).

In some embodiments, process 730 may use equation 828A in FIG. 8F to compute location data points 830A-830FF (e.g., centered location data points). As illustrated in FIG. 8F, equation 828A may compute a centered data point using $X_i = Y_i - T_i$, wherein $X_i$ is the centered location data point, $Y_i$ is a value of an original data point, and $T_i$ is a target value (e.g., statistic) for the $i^{th}$ category, part, product, etc. For example, in FIGS. 8D and 8E, process 730 may convert the value of column 824C in row 826A—a row corresponding to Product A—to a centered data point by subtracting the value of column 824C in row 826A (e.g., $Y_i=18.5$) from the target value illustrated for Product A in product statistics table 820 (e.g., $T_i=19.73$). Conversely, process 730 may convert the value of column 824C in row 826M—a row corresponding to Product B—by subtracting the value of column 824C in row 826M (e.g., $Y_i=22.2$) from the target value illustrated for Product B in product statistics table 820 (e.g., $T_i=21.50833$). Other values stored in column 824C may be converted to centered location data points in analogous ways described above.

In some embodiments, the term $T_i$ in equation 828A may represent an average value of an attribute (e.g., column) stored within rows corresponding to a respective category, part, product, etc. For instance, as described previously, product statistics table 820 in FIG. 8D illustrates that $T_i=19.73$ for Product A (e.g., a first category) and that $T_i=21.50833$ for Product B (e.g., a second category). That is, in FIGS. 8D and 8E, the value of $T_i$ for Product A indicates that, in rows 826A-826K corresponding to Product A (and any other rows of dataset 822 that correspond to Product A), the average of the values stored within column 824C is 19.73. Conversely, in FIGS. 8D and 8E, the value of $T_i$ for Product B indicates that, in rows 826M-826S corresponding to Product B (and any other rows of dataset 822 corresponding to Product B), the average of the values stored in column 824C equals 21.50833.

It shall be noted that the above example is not intended to be limiting and the value of $T_i$ may be different if user interface 800 is displayed for a dataset other than dataset 822. It shall also be noted that user interface 800 may illustrate different values for $T_i$ if drag-and-drop input 810A instead dragged a different draggable item to y-axis configuration drag-and-drop zone 804A than illustrated in FIG. 8B.

In some embodiments, process 730 may additionally, or alternatively, compute dispersion data points. For instance, as also shown in FIG. 8D, process 730 computes a plurality of dispersion data points 832A-832FF that are, in turn, presented (e.g., displayed) in real-time view 808 via process 740 of method 700. Specifically, as illustrated by user interface element 824 in FIG. 8D, dispersion data points 832A-832FF represent centered moving range dispersion data points for the values illustrated in column 824C of FIG. 8E. Centered moving range dispersion data points, as generally used herein, may refer to data points that indicate the moving range of the values illustrated in column 824C relative to a corresponding category-specific mean (or other central reference point).

It shall be noted that example illustrated in FIG. 8D describes one type of dispersion data point that process 730 may compute. Process 730 may analogously compute other types of dispersion data points without departing from the scope of the disclosure (e.g., standardized moving range dispersion data points, centered moving range dispersion data points, standardized range dispersion data points, centered range dispersion data points, etc.).

In some embodiments, process 730 may additionally, or alternatively compute different location data points than those illustrated in FIG. 8D. For instance, instead of computing centered data points (e.g., a first type of location data points), process 730 may compute standardized centered data points (e.g., a second type of location data point). Standardized centered data points, as generally used herein, may refer to data points that have been adjusted to have a mean of zero (0) and a standard deviation of one (1).

As illustrated in FIG. 8F, equation 828B may compute a standardized centered data point using $X_i = Y_i - T_i/R_i$, wherein $X_i$ is the standardized centered data point, $Y_i$ is a value of an original data point, $R_i$ is a dispersion statistic for the $i^{th}$ category, part, or product, and $T_i$ is a target value (e.g., statistic) for the $i^{th}$ category, part, or product. Non-limiting examples of $R_i$ may include a range, standard deviation, or moving range of the $i^{th}$ category, part, product.

For example, with reference to FIG. 8E, process 730 may convert the value of column 824C in row 826A—a row corresponding to Product A—to a standardized centered data point by subtracting the value of column 824C in row 826A (e.g., $Y_i=18.5$) from the target value illustrated for Product A in product statistics table 820 (e.g., $T_i=19.73$), and dividing a result of the subtracting by the sigma statistic illustrated for Product A in product statistics table 820 (e.g., $R_i=1.189474$). Conversely, process 730 may convert the value of column 824C in row 826M—a row corresponding to Product B—to a standardized centered data point by subtracting the value of column 824C in row 826A (e.g., $Y_i=22.2$) from the target value illustrated for Product B in product statistics table 820 (e.g., $T_i=21.50833$), and dividing a result of the subtracting by the sigma statistic illustrated for Product B in product statistics table 820 (e.g., $R_i=0.781818$). Other values stored in column 824C may be converted to standardized centered data points in analogous ways described above.

In some embodiments, the term $R_i$ in equation 828B may represent a range, standard deviation, moving range, or the like for the $i^{th}$ category, part, or product. For instance, in the example illustrated in FIG. 8D, user interface element 824 indicates that $R_i$ for Products A and B correspond to a moving range dispersion statistic. Specifically, in the example of FIGS. 8D and 8E, the value of $R_i$ for Product A indicates that, in rows 826A-826K corresponding to Product A (and any other rows of dataset 822 that correspond to Product A), the moving range of the values stored within column 824C equals 1.189474 (e.g., a first value). Conversely, in FIGS. 8D and 8E, the value of $R_i$ for Product B indicates that, in rows 826M-826S corresponding to Product B (and any other rows of dataset 822 corresponding to Product B), the moving range of the values stored in column 824C equals 0.781818 (e.g., a second value).

It shall be noted that, in some embodiments, process 730 may compute other types of location data points and/or dispersion data points than described above. For example, in analogous ways described previously, process 730 may compute centered "XBar" location data points, standardized "XBar" location data points, standardized moving range dispersion data points, and/or standardized range dispersion data points.

Referring to FIG. 7, process 740 of method 700 may update the real-time view of the short run control chart to include the location data points. Process 740, in some embodiments, may be performed after an execution of process 730. For instance, in a non-limiting example, after process 730 computes the location data points 830A-830FF illustrated in FIG. 8D, method 700 may, in turn, execute process 740 to display the location data points 830A-830FF in real-time view 808. In some embodiments, Process 740—like process 730—may be executed before a release of a drag-and-drop input is detected. For instance, in the example of FIG. 8D, method 700 may execute process 740 while (e.g., when) process 720 detects drag-and-drop input 810B hovering draggable item 802E over part variable drag-and-drop graph zone 804C.

In some embodiments, process 740 may update real-time view 808 to include a preview of the short run control chart when a drag-and-drop input hovers a draggable item over a respective drag-and-drop graph zone. The preview of the short run control chart, as generally used herein, may visually indicate a next state of the short run control chart if the drag-and-drop input continues to completion. For instance, in FIG. 8C, real-time view 808 illustrates a state of the short run control chart before drag-and-drop input 810B in FIG. 8D is detected. Specifically, in FIG. 8C, real-time view 808 includes location data points 834A-834FF (e.g., different from location data points 830A-830FF in FIG. 8D) and dispersion data points 836A-836FF (e.g., different from dispersion data points 832A-832FF in FIG. 8D).

Furthermore, as shown in FIG. 8D, while detecting drag-and-drop input 810B hovering draggable item 802E over part variable drag-and-drop graph zone 804C, process 740 updates real-time view to include a preview of the short run control chart that indicates a next state of the short run control chart if drag-and-drop input 810B continues to completion. Specifically, as shown in FIG. 8D, the preview displayed in real-time view 808 includes location data points 830A-803EE and dispersion data points 832A-832FF. If drag-and-drop input 810B is canceled (e.g., does not drop draggable item 810E in part variable drag-and-drop graph zone 804C), process 740, in some embodiments, may cease displaying the preview in real-time view 808 (e.g., cease displaying location data points 830A-830FF and dispersion data points 832A-832FF) and return real-time view 808 to the state illustrated in FIG. 8C. Conversely, in some embodiments, if drag-and-drop input 810B is completed (e.g., drops draggable item 810B in part variable drag-and-drop graph zone 804C), process 740 may finalize the changes indicated in the preview displayed in real-time view 808. In the example of FIG. 8D, finalizing the changes indicated by the preview may include, but should not be limited to, maintaining display of the location data points 830A-803EE and the dispersion data points 832A-832FF in real-time view 808.

In some embodiments, real-time view 808 may include one or more charts that share a common x-axis. For instance, as shown in FIG. 8D, real-time view 808 includes a location chart 812A and a dispersion chart 812B that have a common x-axis 816. Process 740, in some embodiments, may update location chart 812A and dispersion chart 812B with the data points computed in process 730. Specifically, in the example of FIG. 8D, process 740 updates location chart 812A and dispersion chart 812B to include the location data points 830A-830FF and the dispersion data points 832A-832FF computed in process 730, respectively. It shall be noted that, in some portions of the disclosure, embodiments of method 700 that execute one or more operations of processes 730 and 740 in response to a detection of one or more drag-and-drop inputs may be referred to as "dynamically updating real-time view 808."

In some embodiments, real-time view 808 may include one or more category (e.g., product) separator lines. A category separate line, as generally used herein, may be any suitable user interface object that visually separates data points associated with different categories (e.g., parts, products, etc.) in real-time view 808. For instance, in the example of FIG. 8D, real-time view 808 includes a plurality of category separator lines 813A and 813B. Category separate line 813A visually separates the location data points 830A-830L corresponding to "Product A" from the location data points 830M-830X corresponding to "Product B". Furthermore, in FIG. 8D, category separator line 813B visually separates the location data points 830M-830X corresponding to "Product B" from the location data points 830Y-830FF corresponding to "Product A."

In some embodiments, as illustrated in FIG. 8D, category separator lines 813A and 813B may also visually separate dispersion data points corresponding to different categories. Specifically, in the example of FIG. 8D, category separate line 813A visually separates the dispersion data points 832A-832L corresponding to "Product A" from the dispersion data points 832M-832X corresponding to "Product B". Furthermore, as illustrated in FIG. 8D, category separator line 813B visually separates the dispersion data points 832M-832X corresponding to "Product B" from the location data points 832Y-832FF corresponding to "Product A."

In some embodiments, process 740 may display location data points corresponding to different categories with different marker appearances. A marker appearance of a data point, as generally used herein, may refer to a visual attribute of the data point, such as size, shape, color, and/or the like. For instance, in the example of FIG. 8D and as indicated by marker appearance legend items 838A-838B, process 740 displays location data points 830A-830L and 830Y-830FF corresponding to "Product A" with a first marker appearance (e.g., a first color, size, shape, and/or the like) and displays location data points 830M-830X corresponding to "Product B" with a different marker appearance (e.g., a second color, size, shape, and/or the like).

In some embodiments, method 700 may detect that a new entry has been added to the dataset. For instance, in FIG. 8G, method 700 detects that a user has added row 826GG to dataset 822 (previously described in FIG. 8E). Additionally, FIG. 8G also shows other rows of dataset 822 that were not included in the view illustrated in FIG. 8E (e.g., the scroll position illustrated in FIG. 8E obscured the display of rows 826T-826FF). While the example illustrated in FIG. 8G describes the new row 826GG being added via user input, it shall be noted that new rows may be added to the dataset for a variety of other reasons without departing from the scope of the disclosure. For instance, in other non-limiting examples, data may be streamed from an external source (e.g., sensor), may be obtained from one or more automated processes, and/or the like.

Figure 8H:
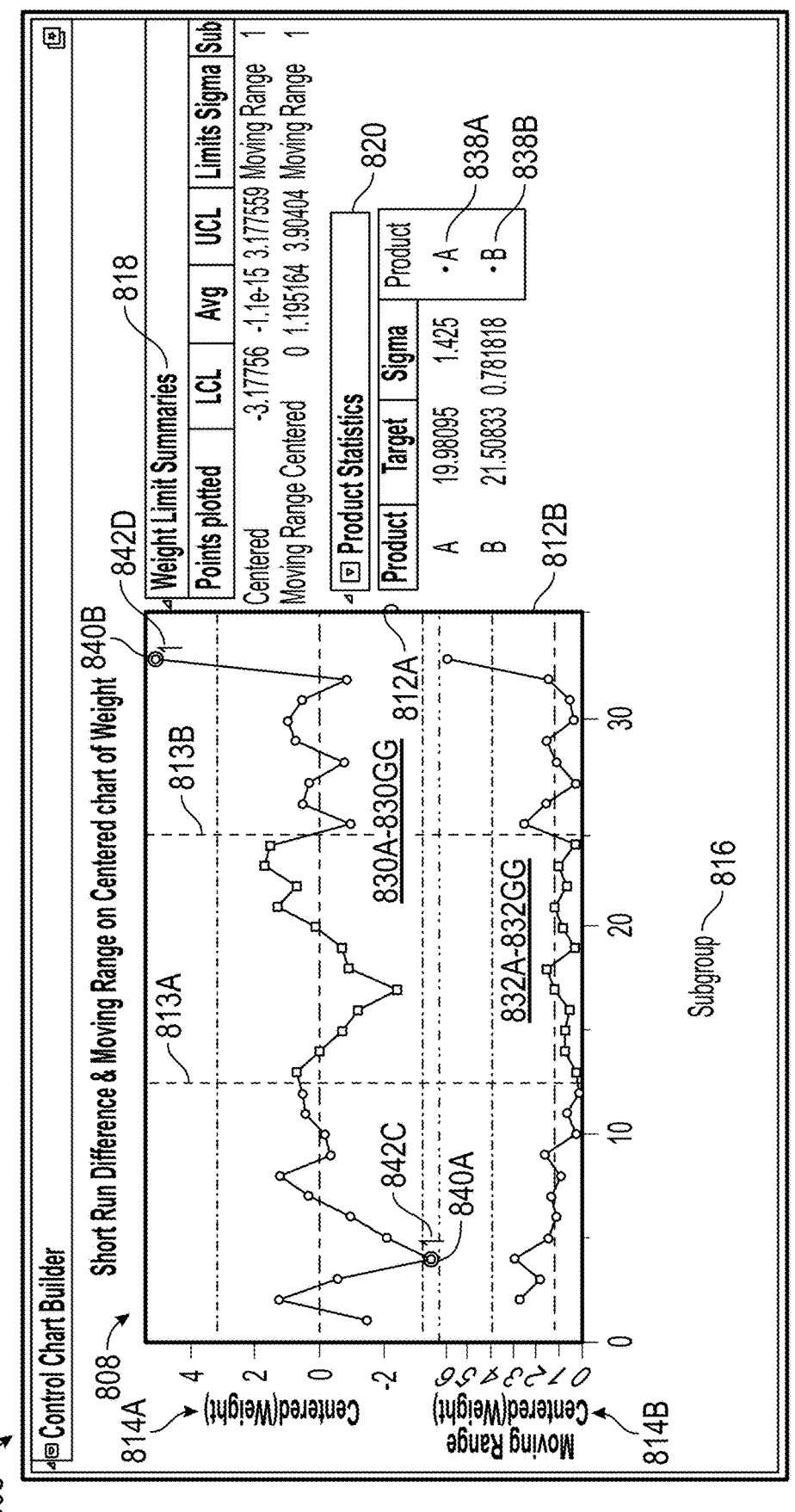

In some embodiments, based on detecting that a new entry has been added to a dataset, method 700 may analogously execute one or more of the operations described in processes 730 and/or 740 for the new entry. For instance, as shown in FIG. 8H, based on detecting new row 826GG in FIG. 8G, method 700 computes a new location data point 830GG corresponding to new row 826GG and, in turn, updates location chart 812A to include the new location data point 830GG. Furthermore, as also shown in FIG. 8G, based on detecting new row 826GG, method 700 also computes a new dispersion data point 832GG corresponding to new row 826GG and, in turn, updates dispersion chart 812B to include the new dispersion data point 832GG. It shall be noted that, in some portions of the disclosure, updating a chart of real-time view 808 to include a data point may be referred to as "updating real-time view 808 to include such data point" (or similar recitations).

In some embodiments, method 700 may scale one or more axes of a respective chart when adding a new data point to a chart of real-time view 808 (e.g., chart 812A or 812B). For instance, in the example of FIGS. 8D and 8H, method 700 changes a scale of y-axis 814A when adding location data point 830GG to location chart 812A. Specifically, as shown in FIG. 8H, new location data point 830GG exceeds the range of values used by y-axis 814A in FIG. 8D. Based on method 700 detecting that new location data point 830GG exceeds the range of values illustrated for y-axis 814A in FIG. 8D (e.g., negative (−3) to three (3)), method 700 scales y-axis 814A from the range of values illustrated in FIG. 8D to a range of values that is not exceeded by new location data point 830GG (e.g., negative (−3) to five (5)).

Additionally, as shown in FIG. 8H, method 700 also changes a scale of y-axis 814B when adding dispersion data point 832GG to dispersion chart 812B. Specifically, as shown in FIG. 8H, new dispersion data point 832GG exceeds the range of values used by y-axis 814B in FIG. 8D. Based on method 700 detecting that new dispersion data point 832GG exceeds the range of values illustrated for y-axis 814B in FIG. 8D (e.g., zero (0) to three (3)), method 700 scales y-axis 814B from the range of values illustrated in FIG. 8D to a range of values that is not exceeded by new dispersion data point 832GG (e.g., zero (0) to six (6)).

Furthermore, in some embodiments, method 700 may scale an x-axis of a chart when adding a new data point to a respective chart of real-time view 808 (e.g., chart 812A or 812B). For instance, in the example of FIGS. 8D and 8H, method 700 changes a scale of x-axis 816 when adding data points 830GG and 832GG to charts 812A and 812B, respectively. Specifically, as shown in FIG. 8H, data points 830GG and 832GG exceed the range of values used by x-axis 816 in FIG. 8D. Based on method 700 detecting that data points 830GG and 832GG exceed the range of values illustrated for x-axis 816 in FIG. 8D (e.g., zero (0) to thirty-five (35)), method 700 scales x-axis 816 from the range of values illustrated in FIG. 8D to a range of values that is not exceeded by data points 830GG and 832GG (e.g., zero (0) to forty (40)).

In some embodiments, method 700 may apply one or more statistical tests (e.g., Nelson tests, Westgard run rules, etc.) to the location data points 830A-830GG. Based on applying the one or more statistical tests, method 700 may detect that one or more of the location data points 830A-830GG passed the one or more statistical tests and/or that one or more of the location data points 830A-830GG failed the one or more statistical tests. Specifically, in the example of FIG. 8H, based on applying the one or more statistical tests to the location data points 830A-830GG, method 700 detects that location data points 830D and 830GG failed to pass a respective statistical test of the one or more statistical tests and that location data points 830A-830C and 830E-830FF passed the one or more statistical tests.

In some embodiments, if a respective location data point of the location data points 830A-830GG fails a respective statistical test, method 700 may display a visual indicator signaling the failure. Conversely, if a respective location data point of the location data points 830A-830GG passes the one or more statistical tests, method 700 may forgo displaying such a visual indicator (e.g., thereby providing visual indication that such location data point successfully passed the one or more statistical tests). For instance, as shown in FIG. 8H, based on detecting that location data points 830D and 830GG failed the respective statistical test, method 700 displays location data points 830D and 830GG with visual indicators 840A and 840B, respectively, to indicate the failure of the respective statistical test. Furthermore, as also illustrated in FIG. 8H, based on detecting that location data points 830E-830FF passed the one or more statistical tests, method 700 forgoes displaying location data points 830D and 830GG with visual indicators to indicate the successful passage of the one or more statistical tests.

In some embodiments, visual indicators 840A and 840B may also indicate the statistical test that a respective location data point failed. For instance, as also illustrated in the example of FIG. 8H, visual indicators 840A and 840B include text 842C and 842D, respectively. Specifically, in the example of FIG. 8H, text 842C and text 842D include the number one (1) to indicate that location data points 830D and 830GG failed the first Nelson test. It shall be noted that the above example is not intended to be limiting and that various forms of visual indicators and textual annotations may be used to convey the results of statistical tests in different embodiments of method 700. It shall also be noted that method 700, in some embodiments, may apply the statistical tests in real time (e.g., in response to the location data points being computed in process 730, in response to method 700 adding new location data points, and/or the like).

Figure 8I:
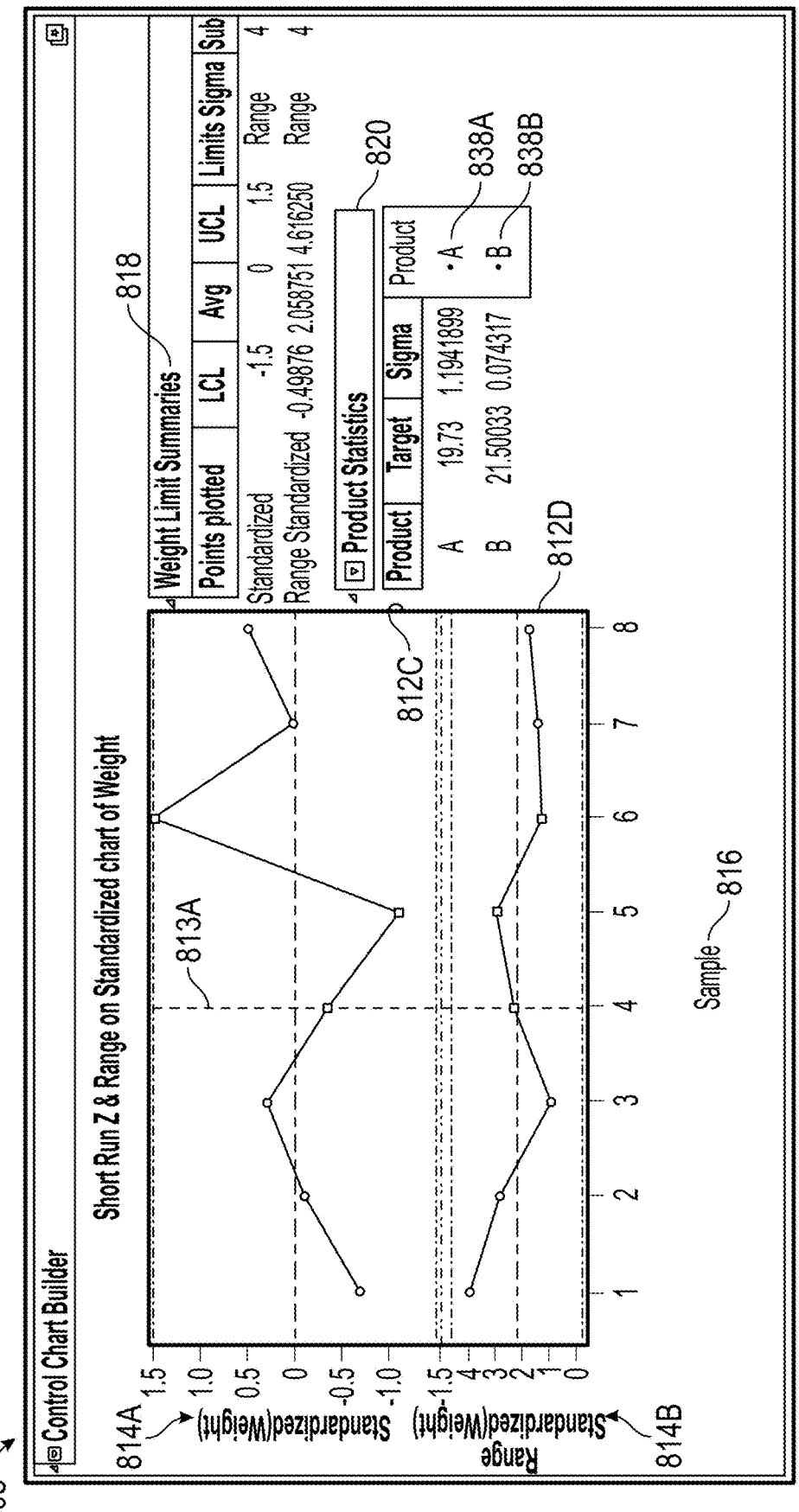
FIG. 8I illustrates another example of a short run control chart, according to at least one embodiment of the present technology.

It shall be noted that the above-described examples are not intended to be limiting and that real-time view 808 may include additional, fewer, or different charts than illustrated in FIG. 8D without departing from the scope of the disclosure. For instance, in the example of FIG. 8I, real-time view 808 includes charts 812C and 812D. Charts 812C and 812D differ in type from the charts 812A and 812B illustrated in FIG. 8D. Specifically, in FIG. 8I, charts 812C and 812D correspond to a summarized standardized "XBar" chart and a range chart ("R chart"), respectively. Method 700, in some embodiments, may use charts 812C and 812D when a dataset (e.g., dataset 822) includes more than one row per subgroup. Conversely, in some embodiments, method 700 may use the charts 812A and 812B illustrated in FIG. 8D when a dataset (e.g., dataset 822) includes one row per subgroup.

Moreover, real-time view 808 may additionally, or alternatively, display other types of charts including, but not limited to, a centered location chart (e.g., chart 812A in FIG. 8D), a standardized location chart (e.g., a chart that includes standardized centered location data points as described in process 730), a centered XBar location chart (e.g., chart 812C), a standardized XBar location chart (e.g., a chart that includes standardized centered XBar location data points), a centered moving range dispersion chart (e.g., chart 812B), a standardized moving range dispersion chart (e.g., a chart that includes standardized moving range dispersion data points as described in process 730), a centered range dispersion chart (e.g., a chart that includes range dispersion data points as described in process 730), and/or a standardized range dispersion range chart (e.g., a chart that includes standardized range dispersion data points as described in process 730).

It shall be noted that the system and methods of the embodiments and variations described herein can be embodied and/or implemented at least in part as a machine comprising a computer-readable medium storing computer-readable instructions. The instructions may be executed by computer-executable components integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, memory sticks (e.g., SD cards, USB flash drives), cloud-based services (e.g., cloud storage), magnetic storage devices, Solid-State Drives (SSDs), or any suitable device. The computer-executable component is preferably a general or application-specific processor, but any suitable dedicated hardware or hardware/firmware combination device can alternatively or additionally execute the instructions.

The systems and methods of the preferred embodiments may additionally, or alternatively, be implemented on an integrated data analytics software application and/or software architecture such as those offered by SAS Institute Inc. or JMP Statistical Discovery LLC of Cary, N.C., USA. Merely for illustration, the systems and methods of the preferred embodiments may be implemented using or integrated with one or more software tools such as JMP®, which is developed and provided by JMP Statistical Discovery LLC.

Although omitted for conciseness, the preferred embodiments include every combination and permutation of the implementations of the systems and methods described herein.

As a person skilled in the art will recognize from the previous detailed description and from the figures and claims, modifications and changes can be made to the embodiments of the disclosure without departing from the scope of the various described embodiments.

What is claimed is:

1. A computer-program product comprising a non-transitory machine-readable storage medium storing computer instructions that, when executed by one or more processors, perform operations comprising:
displaying a user interface that is configured to create a short run control chart from a dataset including short run production data for a plurality of products manufactured along a same production line, wherein the user interface includes:
a real-time view of the short run control chart, and
a plurality of drag-and-drop graph zones displayed in association with the real-time view of the short run control chart;
detecting, via the plurality of drag-and-drop graph zones, a plurality of drag-and-drop inputs, including:
a first drag-and-drop input into a first drag-and-drop graph zone of the plurality of drag-and-drop graph zones that assigns a first column of the dataset to a y-axis configuration of a first part of the real-time view of the short run control chart, and
a second drag-and-drop input into a second drag-and-drop graph zone of the plurality of drag-and-drop graph zones that assigns a second column including a portion of the short run production data for the multiple products of the dataset to a product variable drag-and-drop graph zone defining a second part of the real-time view of the short run control chart;
converting, via a data centering algorithm, values from the first column of the dataset into computed location data points for each of the plurality of products; and
dynamically updating the short run control chart to include the computed location data points for each of the plurality of products during a dragging operation of the first drag-and-drop input or of the second drag-and-drop input, wherein:
the user interface further dynamically displays a statistics and summaries section that includes product-specific summary data corresponding to each of the plurality of products, and
the statistics and summaries section is dynamically updated in real time as the short run control chart is updated during the dragging operation of the first drag-and-drop input or of the second drag-and-drop input.

2. The computer-program product according to claim 1, wherein:
the real-time view of the short run control chart includes a plurality of charts, including a location chart and a dispersion chart that share a common x-axis,
the computer instructions, when executed by the one or more processors, perform operations further comprising:
converting, via a data dispersion algorithm, the values from the first column of the dataset into dispersion data points, and
dynamically updating the short run control chart includes:
updating the real-time view of the short run control chart to include the location data points in the location chart, and
updating the real-time view of the short run control chart to include the dispersion data points in the dispersion chart.

3. The computer-program product according to claim 1, wherein:
the dataset represents measurements collected from a manufacturing line,
the dataset includes rows of data that correspond to production runs conducted on the manufacturing line, and
a respective row of data includes one or more parameters observed for a respective production run and specifies a product manufactured during the respective production run.

4. The computer-program product according to claim 1, wherein:

the real-time view of the short run control chart is dynamically updated as the plurality of drag-and-drop inputs are detected, and dynamically updating the short run control chart as the plurality of drag-and-drop inputs are detected includes:

in response to detecting the plurality of drag-and-drop inputs:

converting, via the data centering algorithm, the values from the first column of the dataset into the location data points; and updating the real-time view of the short run control chart to include the location data points.

5. The computer-program product according to claim 1, wherein dynamically updating the short run control chart includes rendering the real-time view of the short run control chart before detecting a release of the first drag-and-drop input or of the second drag-and-input respectively into the first drag-and-drop graph zone of the plurality of drag-and-drop graph zones or the second drag-and-drop graph zone of the plurality of drag-and-drop graph zones.

6. The computer-program product according to claim 1, wherein dynamically updating the short run control chart includes rendering the real-time view of the short run control chart before detecting a completion of the first drag-and-drop input or of the second drag-and-input respectively into the first drag-and-drop graph zone of the plurality of drag-and-drop graph zones or the second drag-and-drop graph zone of the plurality of drag-and-drop graph zones.

7. The computer-program product according to claim 1, wherein dynamically updating the short run control chart includes concurrently performing, in real-time, a first update to the first part of the real-time view of the short run control chart including positioning onto the first part the computed location data points.

8. The computer-program product according to claim 1, wherein dynamically updating the short run control chart includes concurrently performing, in real-time, a second update to the second part of the real-time view of the short run control chart including dynamically changing a scale of a y-axis of the short run control chart from a first range of values to a second range of values based on the computed location data points.

9. The computer-program product according to claim 1, wherein the dragging operation of the first drag-and-drop input or of the second drag-and-drop input includes selecting a user interface element from the user interface and dragging the user interface element to a respective drag-and-drop zone of the plurality of drag-and-drop zones.

10. The computer-program product according to claim 1, wherein the dynamically updating includes:

(a) rendering a preview of a next state of the short run control chart while a draggable item is hovering over a corresponding drag-and-drop graph zone, and (b) concurrently updating at least two sub-components of the short run control chart comprising a location chart and a dispersion chart.

11. The computer-program product according to claim 1, wherein:

the second drag-and-drop input includes hovering a draggable item corresponding to the second column of the dataset over the second drag-and-drop graph zone for the product variable drag-and-drop graph zone, and dynamically updating the short run control chart includes:

38 while the second drag-and-drop input is hovering the draggable item over the drag-and-drop graph zone for the product variable drag-and-drop graph zone:

updating the real-time view of the short run control chart to include a preview of the short run control chart that indicates a next state of the short run control chart following a completion of the second drag-and-drop input.

12. The computer-program product according to claim 11, wherein:

the preview of the short run control chart includes the location data points, and dynamically updating the short run control chart further includes:

after detecting the completion of the second drag-and-drop input:

maintaining display of the location data points in the real-time view of the short run control chart.

13. The computer-program product according to claim 1, wherein:

the location data points are centered data points, the values from the first column of the dataset include one or more values associated with a first category and one or more values associated with a second category, and converting the values from the first column of the dataset into the centered data points includes:

converting a respective value associated with the first category to a centered data point by subtracting a target category statistic computed for the first category from the respective value associated with the first category, and converting a respective value associated with the second category to a centered data point by subtracting a target category statistic computed for the second category from the respective value associated with the second category.

14. The computer-program product according to claim 13, wherein:

the target category statistic for the first category is an average of the values in the first column of the dataset that correspond to the first category, and the target category statistic for the second category is an average of the values in the first column of the dataset that correspond to the second category.

15. The computer-program product according to claim 1, wherein:

the location data points include one or more location data points corresponding to a first category and one or more location data points corresponding to a second category, and the real-time view of the short run control chart that includes the location data points further comprises:

one or more category separator lines that visually separate the one or more location data points corresponding to the first category from the one or more location data points corresponding to the second category.

16. The computer-program product according to claim 15, wherein:

the computer instructions, when executed by the one or more processors, perform operations further comprising:

converting, via a data dispersion algorithm, the values from the first column of the dataset into dispersion data points, wherein the dispersion data points include:

one or more dispersion data points corresponding to the first category, and one or more dispersion data points corresponding to the second category, the real-time view of the short run control chart includes the location data points and further includes the dispersion data points, and the one or more category separator lines visually separate:

the one or more location data points corresponding to the first category from the one or more location data points corresponding to the second category, and the one or more dispersion data points corresponding to the first category from the one or more dispersion data points corresponding to the second category.

17. The computer-program product according to claim 1, wherein:

the user interface further includes a column selection region, and the column selection region includes one or more draggable items corresponding to one or more columns of the dataset, including a first draggable item corresponding to the first column of the dataset and a second draggable item corresponding to the second column of the dataset.

18. The computer-program product according to claim 17, wherein:

the first drag-and-drop input comprises a selection of the first draggable item and a movement of the first draggable item from the column selection region to the y-axis configuration drag-and-drop graph zone, and the second drag-and-drop input comprises a selection of the second draggable item and a movement of the second draggable item from the column selection region to the drag-and-drop graph zone for the product variable drag-and-drop graph zone.

19. The computer-program product according to claim 1, wherein:

the location data points include one or more location data points corresponding to a first category and one or more location data points corresponding to a second category, and dynamically updating the short run control chart to include the location data points includes:

displaying the one or more location data points corresponding to the first category with a first marker color, and displaying the one or more location data points corresponding to the second category with a second marker color, different from the first marker color.

20. The computer-program product according to claim 19, wherein:

the computer instructions, when executed by the one or more processors, perform operations further comprising:

converting, via a data dispersion algorithm, the values from the first column of the dataset into dispersion data points, wherein the dispersion data points include:

one or more dispersion data points corresponding to the first category, and one or more dispersion data points corresponding to the second category, the real-time view of the short run control chart includes the location data points and further includes the dispersion data points, and dynamically updating the short run control chart to include the dispersion data points comprises:

displaying the one or more dispersion data points corresponding to the first category with the first marker color, and displaying the one or more dispersion data points corresponding to the second category with the second marker color.

21. The computer-program product according to claim 1, wherein:

the dataset is a multi-category dataset, and the multi-category dataset includes rows of data associated with a plurality of categories, including:

one or more rows of data associated with a first category of the plurality of categories, and one or more rows of data associated with a second category of the plurality of categories.

22. The computer-program product according to claim 21, wherein:

the plurality of categories correspond to different products, the first category corresponds to a first product, and the second category corresponds to a second product, different from the first product.

23. The computer-program product according to claim 1, wherein the computer instructions, when executed by the one or more processors, perform operations further comprising:

detecting that a new row has been added to the dataset, and based on detecting the new row in the dataset:

converting, via the data centering algorithm, a value corresponding to the first column in the new row to an additional location data point, and updating the real-time view of the short run control chart to include the additional location data point.

24. The computer-program product according to claim 23, wherein:

the real-time view of the short run control chart includes a y-axis, the y-axis of the real-time view of the short run control chart uses a first range of values to display the location data points, the additional location data point exceeds the first range of values, and updating the real-time view of the short run control chart to include the additional location data point comprises:

scaling the y-axis from having the first range of values to having a second range of values that is not exceeded by the additional location data point.

25. The computer-program product according to claim 23, wherein:

the real-time view of the short run control chart includes an x-axis, the x-axis of the real time view of the short run control chart uses a first range of values to display the location data points, the additional location data point exceeds the first range of values, and updating the real-time view of the short run control chart to include the additional location data point comprises:

scaling the x-axis from having the first range of values to having a second range of values that is not exceeded by the additional location data point.

26. The computer-program product according to claim 1, wherein:

the location data points are standardized centered data points, the values from the first column of the dataset include one or more values associated with a first category and one or more values associated with a second category, and converting the values from the first column of the dataset into the standardized centered data points includes:

converting a respective value associated with the first category to a standardized centered data point by subtracting a target category statistic computed for the first category from the respective value associated with the first category and dividing a result of the subtracting by a dispersion category statistic computed for the first category, and converting a respective value associated with the second category to a standardized centered data point by subtracting a target category statistic computed for the second category from the respective value associated with the second category and dividing a result of the subtracting by a dispersion category statistic computed for the second category.

27. The computer-program product according to claim 26, wherein:

the dispersion category statistic computed for the first category is a range of the values in the first column of the dataset that correspond to the first category, and the dispersion category statistic computed for the second category is a range of the values in the first column of the dataset that correspond to the second category.

28. The computer-program product according to claim 26, wherein:

the dispersion category statistic computed for the first category is a standard deviation of the values in the first column of the dataset that correspond to the first category, and the dispersion category statistic computed for the second category is a standard deviation of the values in the first column of the dataset that correspond to the second category.

29. The computer-program product according to claim 26, wherein:

the dispersion category statistic computed for the first category is a moving range of the values in the first column of the dataset that correspond to the first category, and the dispersion category statistic computed for the second category is a moving range of the values in the first column of the dataset that correspond to the second category.

30. A computer-implemented method comprising:

displaying a user interface that is configured to create a short run control chart from a dataset including short run production data for a plurality of products manufactured along a same production line, wherein the user interface includes:

a real-time view of the short run control chart, and a plurality of drag-and-drop graph zones displayed in association with the real-time view of the short run control chart;

detecting, via the plurality of drag-and-drop graph zones, a plurality of drag-and-drop inputs, including:

a first drag-and-drop input that includes a selection and a dragging of a first user interface element across the user interface into a first drag-and-drop graph zone of the plurality of drag-and-drop graph zones that assigns a first column of the dataset to a y-axis configuration of a first part of the real-time view of the short run control chart, and a second drag-and-drop input that includes a selection and a dragging of a second user interface element across the user interface into a second drag-and-drop graph zone of the plurality of drag-and-drop graph zones that assigns a second column including a portion of the short run production data for the multiple products of the dataset to a product variable drag-and-drop graph zone defining a second part of the real-time view of the short run control chart;

converting, via a data centering algorithm, values from the first column of the dataset into computed location data points; and updating the short run control chart to include the computed location data points in response to the first drag-and-drop input or of the second drag-and-drop input, wherein:

the user interface further dynamically displays a statistics and summaries section that includes product-specific summary data corresponding to each of the plurality of products, and the statistics and summaries section is dynamically updated in real time as the short run control chart is updated during the dragging operation of the first drag-and-drop input or of the second drag-and-drop input.

31. The computer-implemented method according to claim 30, wherein:

the second drag-and-drop input includes hovering a draggable item corresponding to the second column of the dataset over the second drag-and-drop graph zone for the product variable drag-and-drop graph zone, and updating the short run control chart includes:

while the second drag-and-drop input is hovering the draggable item over the second drag-and-drop graph zone for the product variable drag-and-drop graph zone:

updating the real-time view of the short run control chart to include a preview of the short run control chart that indicates a next state of the short run control chart following a completion of the second drag-and-drop input.

32. The computer-implemented method according to claim 30, wherein:

the real-time view of the short run control chart includes a plurality of charts, including a location chart and a dispersion chart that share a common x-axis, the computer-implemented method further comprises:

converting, via a data dispersion algorithm, the values from the first column of the dataset into dispersion data points, and updating the short run control chart includes:

updating the real-time view of the short run control chart to include the location data points in the location chart, and updating the real-time view of the short run control chart to include the dispersion data points in the dispersion chart.

33. The computer-implemented method according to claim 30, wherein:

the user interface further includes a column selection region, and the column selection region includes one or more draggable items corresponding to one or more columns of the dataset, including a first draggable item corresponding to the first column of the dataset and a second draggable item corresponding to the second column of the dataset.

34. A computer-implemented system comprising:
one or more processors;
a memory;
a computer-readable medium operably coupled to the one
    or more processors, the computer-readable medium
having computer-readable instructions stored thereon
    that, when executed by the one or more processors,
    cause a computing device to perform operations com-
    prising:
    displaying a user interface that is configured to create
a short run control chart from a dataset including
        short run production data for a plurality of products
        manufactured along a same production line, wherein
        the user interface includes:
        a real-time view of the short run control chart, and
a plurality of drag-and-drop graph zones displayed in
            association with the real-time view of the short run
            control chart;
    detecting, via the plurality of drag-and-drop graph
        zones, a plurality of drag-and-drop inputs, including:
a first drag-and-drop input into a first drag-and-drop
            graph zone of the plurality of drag-and-drop graph
            zones that assigns a first column of the dataset to
            a y-axis configuration of a first part of the real-
            time view of the short run control chart, and
a second drag-and-drop input into a second drag-
            and-drop graph zone of the plurality of drag-and-
            drop graph zones that assigns a second column
            including a portion of the short run production
            data for the multiple products of the dataset to a
product variable drag-and-drop graph zone defin-
            ing a second part of the real-time view of the short
            run control chart;
    converting, via a data centering algorithm, values from
        the first column of the dataset into computed location
data points for each of the plurality of products; and
    dynamically updating the real-time view of the short
        run control chart to include the computed location
        data points for each of the plurality of products
        during a dragging operation of the first drag-and-drop input or of the second drag-and-drop input,
        wherein:
        the user interface further dynamically displays a
            statistics and summaries section that includes
            product-specific summary data corresponding to
each of the plurality of products, and
        the statistics and summaries section is dynamically
            updated in real time as the short run control chart
            is updated during the dragging operation of the
            first drag-and-drop input or of the second drag-and-drop input.
35. The computer-implemented system according to
claim 34, wherein:
the second drag-and-drop input includes hovering a drag-
    gable item corresponding to the second column of the
dataset over the second drag-and-drop graph zone for
    the product variable drag-and-drop graph zone, and
dynamically updating the short run control chart includes:
    while the second drag-and-drop input is hovering the
        draggable item over the drag-and-drop graph zone
for the product variable drag-and-drop graph zone:

updating the real-time view of the short run control
        chart to include a preview of the short run control
        chart that indicates a next state of the short run
        control chart following a completion of the second
        drag-and-drop input.
36. The computer-implemented system according to
claim 35, wherein:
the preview of the short run control chart includes the
    location data points, and
dynamically updating the short run control chart further
    includes:
    after detecting the completion of the second drag-and-
        drop input:
        maintaining display of the location data points in the
            real-time view of the short run control chart.
37. A computer-implemented method comprising:
displaying a user interface that is configured to create a
    short run control chart from a dataset including short
    run production data for a plurality of products, wherein
    the user interface includes:
    a real-time view of the short run control chart, and
    a plurality of drag-and-drop graph zones displayed in
        association with the real-time view of the short run
        control chart;
detecting, via the plurality of drag-and-drop graph zones,
    a plurality of drag-and-drop inputs, including:
    a first drag-and-drop input that includes a selection and
        a dragging of a first user interface element across the
        user interface into a first drag-and-drop graph zone
        of the plurality of drag-and-drop graph zones that
        assigns a first column of the dataset to a y-axis
        configuration of a first part of the real-time view of
        the short run control chart, and
    a second drag-and-drop input that includes a selection
        and a dragging of a second user interface element
        across the user interface into a second drag-and-drop
        graph zone of the plurality of drag-and-drop graph
        zones that assigns a second column including a
        portion of the short run production data for the
        multiple products of the dataset to a product variable
        drag-and-drop graph zone defining a second part of
        the real-time view of the short run control chart;
converting, via a data centering algorithm, values from
    the first column of the dataset into computed location
    data points; and
updating the short run control chart to include the com-
    puted location data points in response to the first
    drag-and-drop input or of the second drag-and-drop
    input, wherein:
    the user interface further dynamically displays a sta-
        tistics and summaries section that includes product-
        specific summary data corresponding to each of the
        plurality of products, and
    the statistics and summaries section is dynamically
        updated in real time as the short run control chart is
        updated during the dragging of the first user interface
        element or of the second user interface element.

* * * * *